(12) United States Patent
Alstrin et al.

(10) Patent No.: US 8,150,863 B2
(45) Date of Patent: Apr. 3, 2012

(54) METHODS, SYSTEMS AND COMPUTER PROGRAM PRODUCTS FOR MONITORING CHANGES TO OBJECTS ON A COMPUTER SYSTEM USING INFORMATION MODELS AND BASELINES

(75) Inventors: Stephen Alstrin, Houston, TX (US); Jiebo Guan, Missouri City, TX (US); Randy Bowie, Stafford, TX (US)

(73) Assignee: NetIQ Corporation, Houston, TX (US)

( * ) Notice: Subject to any disclaimer, the term of this patent is extended or adjusted under 35 U.S.C. 154(b) by 198 days.

(21) Appl. No.: 12/724,482

(22) Filed: Mar. 16, 2010

(65) Prior Publication Data

US 2010/0174682 A1 Jul. 8, 2010

Related U.S. Application Data

(63) Continuation of application No. 11/779,444, filed on Jul. 18, 2007, now Pat. No. 7,707,183.

(60) Provisional application No. 60/820,007, filed on Jul. 21, 2006.

(51) Int. Cl.
G06F 17/00 (2006.01)
G06F 7/00 (2006.01)
(52) U.S. Cl. ......... 707/756; 707/639; 707/803; 707/641
(58) Field of Classification Search .................. 707/756, 707/639, 803, 641
See application file for complete search history.

(56) References Cited

U.S. PATENT DOCUMENTS

| | | | |
|---|---|---|---|
| 7,206,805 B1 * | 4/2007 | McLaughlin, Jr. | 709/203 |
| 7,225,208 B2 * | 5/2007 | Midgley et al. | 707/204 |
| 7,539,704 B2 * | 5/2009 | Brodersen et al. | 707/203 |
| 7,596,713 B2 * | 9/2009 | Mani-Meitav et al. | 714/6 |
| 7,627,617 B2 * | 12/2009 | Kavuri et al. | 707/204 |
| 2007/0255768 A1 * | 11/2007 | Shitomi et al. | 707/204 |

OTHER PUBLICATIONS

Tripwire Enterprise, Single-point Change Auditing to Improve Compliance, Availability and Security, www.tripwire.com; 4 pages, 2005.

* cited by examiner

*Primary Examiner* — Kuen Lu
(74) *Attorney, Agent, or Firm* — Myers Bigel Sibley & Sajovec

(57) ABSTRACT

Methods for monitoring changes in objects on a computer system include receiving a request to generate a baseline snapshot of a plurality of objects having associated object types. The object types include at least one object having an object type not managed by a file system of the computer system. Current information is obtained, responsive to the request to generate a baseline snapshot, from a plurality of data collectors to determine at least one attribute of each of the objects to define the baseline snapshot. A request for a baseline report for the objects is received. Updated information is obtained, responsive to the request for a baseline report, from the plurality of data collectors to update the at least one attribute of each of the objects. The baseline snapshot is compared to the obtained updated information to determine if any of the objects have changed. Receiving the request to generate the baseline snapshot may be preceded by generating a baseline definition query that identifies object types to be included in the generated baseline snapshot and their associated attributes and the received request to generate the baseline report includes an identification of the baseline definition query.

12 Claims, 21 Drawing Sheets

METHODS, SYSTEMS AND COMPUTER PROGRAM PRODUCTS FOR MONITORING CHANGES TO OBJECTS ON A COMPUTER SYSTEM USING INFORMATION MODELS AND BASELINES

CROSS-REFERENCE TO RELATED APPLICATION

The present application claims priority to and is a continuation of U.S. patent application Ser. No. 11/779,444, filed Jul. 18, 2007, now U.S. Pat. No. 7,707,183 which claims the benefit of and priority to U.S. Provisional Patent Application No. 60/820,007, entitled "METHODS, SYSTEMS AND COMPUTER PROGRAM PRODUCTS FOR MONITORING CHANGES TO OBJECT ON A COMPUTER SYSTEM USING INFORMATION MODELS AND BASELINES," filed Jul. 21, 2006, the disclosures of which are hereby incorporated herein by reference as if set forth in their entirety.

BACKGROUND OF THE INVENTION

The present invention relates generally to computer systems, and more particularly, to monitoring of activity on computer systems.

As the popularity of the computer networks continues to increase, so does the challenge of controlling the systems making up the network where a variety of activities may be carried out over time by different people in an uncoordinated manner. Such actions may increase the challenges for network managers in monitoring change activity to address problems encountered by users and maintain a desired service level for the network. Thus, network managers may continue to look for ways to monitor changes to and the performance of the network and debug the network for any problems that may arise.

The ISO-17799/BS7799 standard defines the three most important goals of information security as confidentiality, integrity and availability. Confidentiality as used herein refers to ensuring that information is accessible only to those authorized to have access. Integrity refers to safeguarding the accuracy and completeness of information and processing methods. Availability refers to ensuring that authorized users have access to information and associated assets when required. Careful control over the computing facility's configuration is typically required to meet these goals.

In an enterprise information technology (IT) environment, ensuring system elements stay in their desired states may be a labor intense and challenging task. System administrators may need to frequently verify that system elements remain in their desired states. In a heterogeneous IT environment, important system elements typically include disparate things, such as the files/directories, settings in system configuration files, lists of ports, configuration options of system services and the like. This range of disparate elements generally requires administrators to understand each of the system elements, the commands, and the APIs to extract data from the disparate elements. The administrators generally may need to use this knowledge to continuously examine (query) the disparate elements and evaluate the data received from the disparate elements. The goal typically is to verify that the system elements have not been changed. The problem may get even more severe when new applications are introduced to an existing IT environment, further widening the list of items to be monitored and/or controlled.

One approach to this problem is the Tripwire Enterprise application available from Tripwire, Inc. Tripwire Enterprise provides single-point change auditing for auditing changes across multi-vendor servers, desktops and the like. In addition, detected changes may be reconciled with authorized changes. Tripwire Enterprise generally requires generating a snapshot of the file system, storing the snapshot in a flat file, re-running the snapshot generating code to generate a new snapshot, comparing the old snapshot to the new snapshot and reporting any detected differences. Thus, to add different devices or the like to its snapshot, the snapshot code of the Tripwire Enterprise application generally must be modified. As such, Tripwire Enterprise may require inordinate amounts of work to extend.

SUMMARY OF THE INVENTION

Embodiments of the present invention provide methods for monitoring changes in objects on a computer system including receiving a request to generate a baseline snapshot of a plurality of objects having associated object types. The object types include at least one object having an object type not managed by a file system of the computer system. Current information is obtained, responsive to the request to generate a baseline snapshot, from a plurality of data collectors to determine at least one attribute of each of the objects to define the baseline snapshot. A request for a baseline report for the objects is received. Updated information is obtained, responsive to the request for a baseline report, from the plurality of data collectors to update the at least one attribute of each of the objects. The baseline snapshot is compared to the obtained updated information to determine if any of the objects have changed. Receiving the request to generate the baseline snapshot may be preceded by generating a baseline definition query that identifies object types to be included in the generated baseline snapshot and their associated attributes and the received request to generate the baseline report includes an identification of the baseline definition query.

In further embodiments, generating the baseline definition query includes determining a platform type and an identification of an object type associated with the platform type for an object type to be included in the baseline definition query, selecting at least one attribute to be included in the baseline definition query for the identified object type, and generating the baseline definition query based on the identified object type and the selected at least one attribute. Generating the baseline definition query may further include determining a filtering criterion (or criteria) to apply to the identified object type by the baseline definition query. The filtering criterion is applied to at least one attribute of the identified object type included in the baseline definition query. Generating the baseline definition query based on the identified object type and the selected at least one attribute may include generating the baseline definition query based on the identified object type, the selected at least one attribute and the determined filtering criterion. Receiving the request to generate the baseline snapshot and/or receiving the request for the baseline report may include receiving an identification of parameters for use in applying the filtering criterion.

In other embodiments, generating the baseline definition query further includes determining a name to be associated with the generated baseline definition query and saving the generated baseline definition query under the determined name. Receiving the request to generate the baseline snapshot and/or receiving the request for the baseline report includes receiving the determined name.

In further embodiments, generating a baseline definition query, receiving a request to generate a baseline snapshot, receiving a request for a baseline report and comparing the baseline snapshot are carried out by a baseline provider module (BP). The identification of an object type and the at least one attribute are specified using terms defined by a uniform information model. Obtaining current information and/or obtaining updated information includes passing a request for the current information and/or updated information from the BP to an information provider module (IP) using the terms defined by the uniform information model. The terms defined by the uniform information model are converted to terms used by the respective data collectors. The current information and/or updated information is requested from the data collectors using the terms used by the respective data collectors. The current information and/or the updated information is received from the data collectors at the IP using the terms used by the respective data collectors. The terms used by the respective data collectors are converted to the terms defined by the uniform information model. The current information and/or the updated information is returned from the IP to the BP using the terms defined by the uniform information model.

In other embodiments, the received request to generate a baseline snapshot includes an identification of an object type not previously processed by the BP. Obtaining current information includes passing a request for an identification of attributes associated with the not previously processed object type from the BP to the IP and returning the identification of attributes to the BP from the IP using the terms defined by the uniform information model. Generating the baseline definition query may further include determining a name to be associated with the generated baseline definition query and saving the generated baseline definition query under the determined name as a baseline definition text file and in a binary form in a baseline definitions database. Receiving the request to generate the baseline snapshot and/or receiving the request for the baseline report may include receiving the determined name and obtaining current information and/or obtaining updated information may include the BP retrieving the generated baseline definition query from the baseline definitions database based on the received determined name responsive to the received request to generate a baseline snapshot and/or the received request for a baseline report. Passing a request for the current information and/or updated information may include the BP generating the request based on the retrieved baseline definition query.

In yet further embodiments, the BP includes a baseline definition loader Module (BDL) and generating the baseline definition query and saving the generated. baseline definition query as a baseline definition text file are carried out by the BDL. Returning the current information may be followed by the following carried out by the BP: 1) receiving the current information from the IP; 2) using the received current information to generate the baseline snapshot; and 3) saving the generated baseline snapshot in a baseline snapshots database. Returning the current information and/or the updated information may be followed by the following carried out by the BP: 1) receiving the updated information from the IP; and 2) retrieving a baseline snapshot from the baseline snapshots database corresponding to the retrieved baseline definition query used to generate the request for the current information and/or the updated information. Comparing the baseline snapshot to the obtained updated information may include comparing the retrieved baseline snapshot to the received updated information to determine if any of the objects have changed. Returning the current information and/or the updated information may include returning object instances and their associated attributes that meet filtering criteria (or criterion) defined by the baseline definition query.

In other embodiments, generating the baseline definition query further includes determining the filtering criterion to apply to the identified object type by the baseline definition query. The filtering criterion is applied to one or more attributes of the identified object type included in the baseline definition query. Generating the baseline definition query based on the identified object type and the selected at least one attribute includes generating the baseline definition query based on the identified object type, the selected at least one attribute and the determined filtering criteria. Receiving the request to generate the baseline snapshot and/or receiving the request for the baseline report may include receiving an identification of parameters for use in applying the filtering criterion.

In further embodiments, saving the generated baseline definition query includes saving the generated baseline definition query as an XML file including static code and a dynamic section including a metatag. Retrieving the generated baseline definition query from the baseline definitions database includes replacing the metatag with dynamic code based on information provided with the received request to generate the baseline snapshot. Generating the baseline definition query may be followed by receiving a request to add a new object type to be monitored on the computer system and updating the IP to support the new object type using the uniform information model by defining terms to be associated with the new object type and attributes thereof under the uniform information model and defining a data collector for the new object type and terms used by the data collector for the new object type.

In yet other embodiments, systems for monitoring changes in objects on a computer system are provided. The systems include a baseline definitions database including a plurality of baseline definition queries configured to generate baseline snapshots of a plurality of objects having associated object types and corresponding attributes specified in the baseline definition queries, including at least one object having an object type not managed by a file system of the computer system. A baseline snapshot database includes a plurality of baseline snapshots based on corresponding ones of the baseline definition queries. A baseline provider module (BP) is configured to obtain current information from a plurality of data collectors to determine the attributes of the plurality of objects to generate the baseline snapshots, to obtain updated information from the plurality of data collectors to update the determined attributes of the plurality of objects and to compare the baseline snapshots to the obtained updated information to determine if any of the objects have changed.

In yet further embodiments, methods for monitoring changes in objects on a computer system are provided, including providing a baseline snapshot of a plurality of objects having associated object types and attributes. The baseline snapshot is generated based on a baseline definition query, wherein the object types and the attributes are specified using terms defined by a uniform information model. A request for a baseline report for the plurality of objects is received at a baseline provider module (BP). A request for updated information regarding the attributes of the plurality of objects is passed from the BP to an information provider module (IP) using the terms defined by the uniform information model. The terms defined by the uniform information model are converted to terms used by a plurality of data collectors to determine the attributes, wherein the respective data collectors determine attributes for corresponding ones of the object types. The updated information is requested from the data collectors using the terms used by the respective data collectors. The updated information is received from the data collectors at the IP using the terms used by the respective data collectors. The terms used by the respective data collectors are converted to the terms defined by the uniform information model. The updated information is returned from the IP to the BP using the terms defined by the uniform information model and the baseline snapshot is compared to the obtained updated information to determine if any of the objects have changed.

In other embodiments, providing the baseline snapshot is preceded by generating the baseline definition query, receiving a request to add a new object type to be monitored on the computer system and updating the IP to support the new object type using the uniform information model by defining terms to be associated with the new object type and attributes thereof under the uniform information model and defining a data collector for the new object type and terms used by the data collector for the new object type. A new baseline definition query is generated including the new object type and attributes thereof using the corresponding terms defined under the uniform information model.

DETAILED DESCRIPTION OF THE INVENTION

Figure 1:
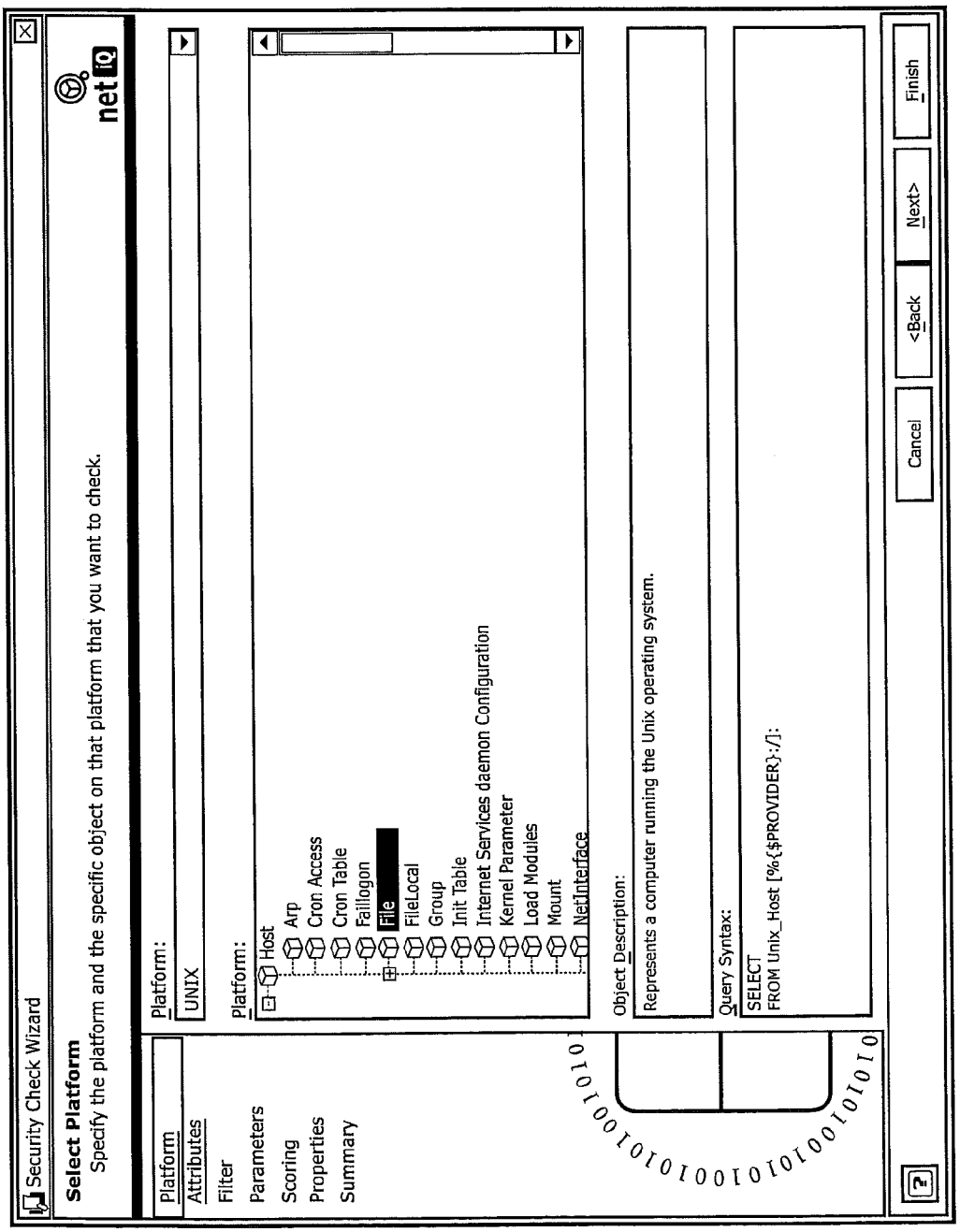
FIGS. 1-7 are graphic user interfaces illustrating operations for creating a query document according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flow chart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In some embodiments of the present invention, methods, systems and computer program products are provided that may play an important role in achieving information integrity by enabling the dynamic (and easy) configuration or reconfiguration of modules that detect changes to important system elements, such as files and directories, system services, service ports, user privileges and the like. In particular, some embodiments directly address integrity aspects of information security and, as such, may play an important role in achieving confidentiality and availability aspects as well.

In some embodiments, improved methodologies may be provided to monitor change activity in a computing system, through the generation of a system baseline and later comparison of a current system configuration against that baseline configuration. Some embodiments utilize a flexible Information Provider (IP) and related Baseline Provider (BP) in order to create a system baseline and make future comparisons against this baseline via a Baseline Definition (BD) query.

While some prior art systems are limited by the problem of changes to accommodate different systems and/or objects added to a network that may not have been present when the change detection was implemented, some embodiments of the present invention may solve this problem by generalizing the processes of defining baselines for important system elements and making future comparisons against these baselines. This in turn may make extensions for coverage to additional system elements relatively trivial.

Some embodiments of the present invention introduce the concept of using information models to describe the system elements of concern, as well as the desired states of system elements. Use of information models may provide system independence. In some embodiments, two loosely coupled parts are provided. One is the actual implementation of the information model (referred to herein as information providers (IP)). The IP(s) may be configured to provide uniform representations of disparate system elements. The second part is the generic baseline definition and measuring system (referred to herein as a baseline provider (BP)). The BP may be configured to detect changes seen in the information models.

Figure 2:
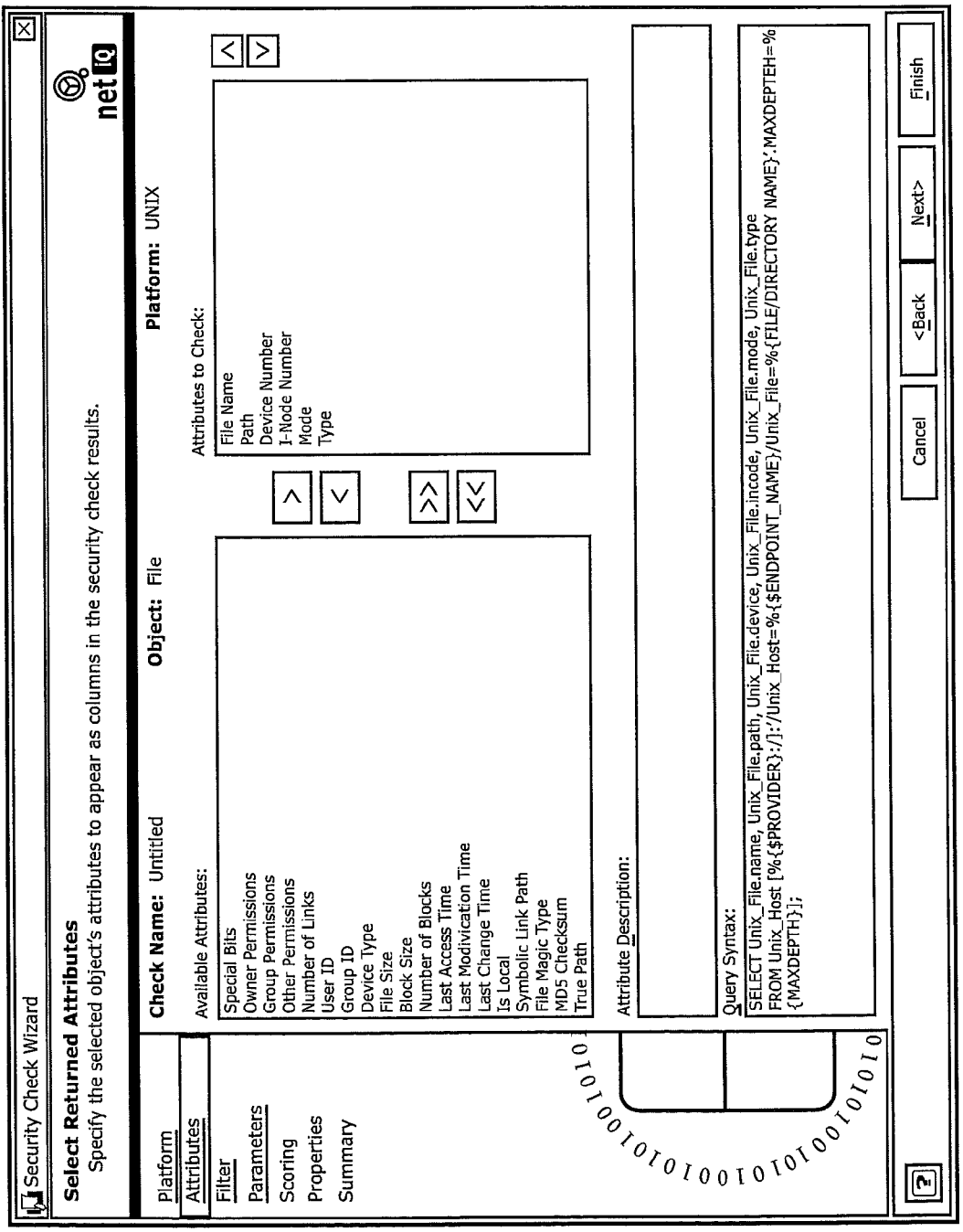
Figure 3:
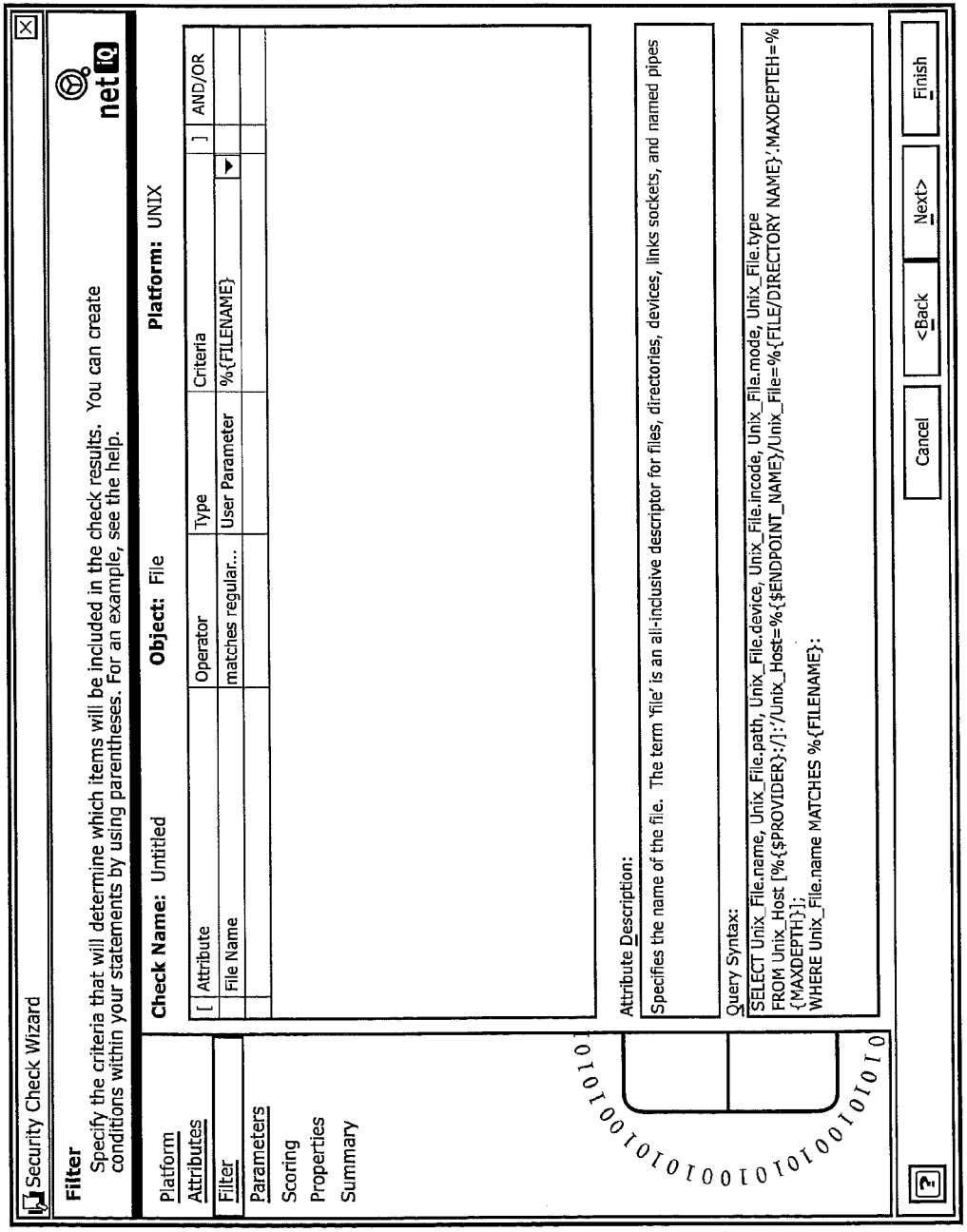
Figure 4:
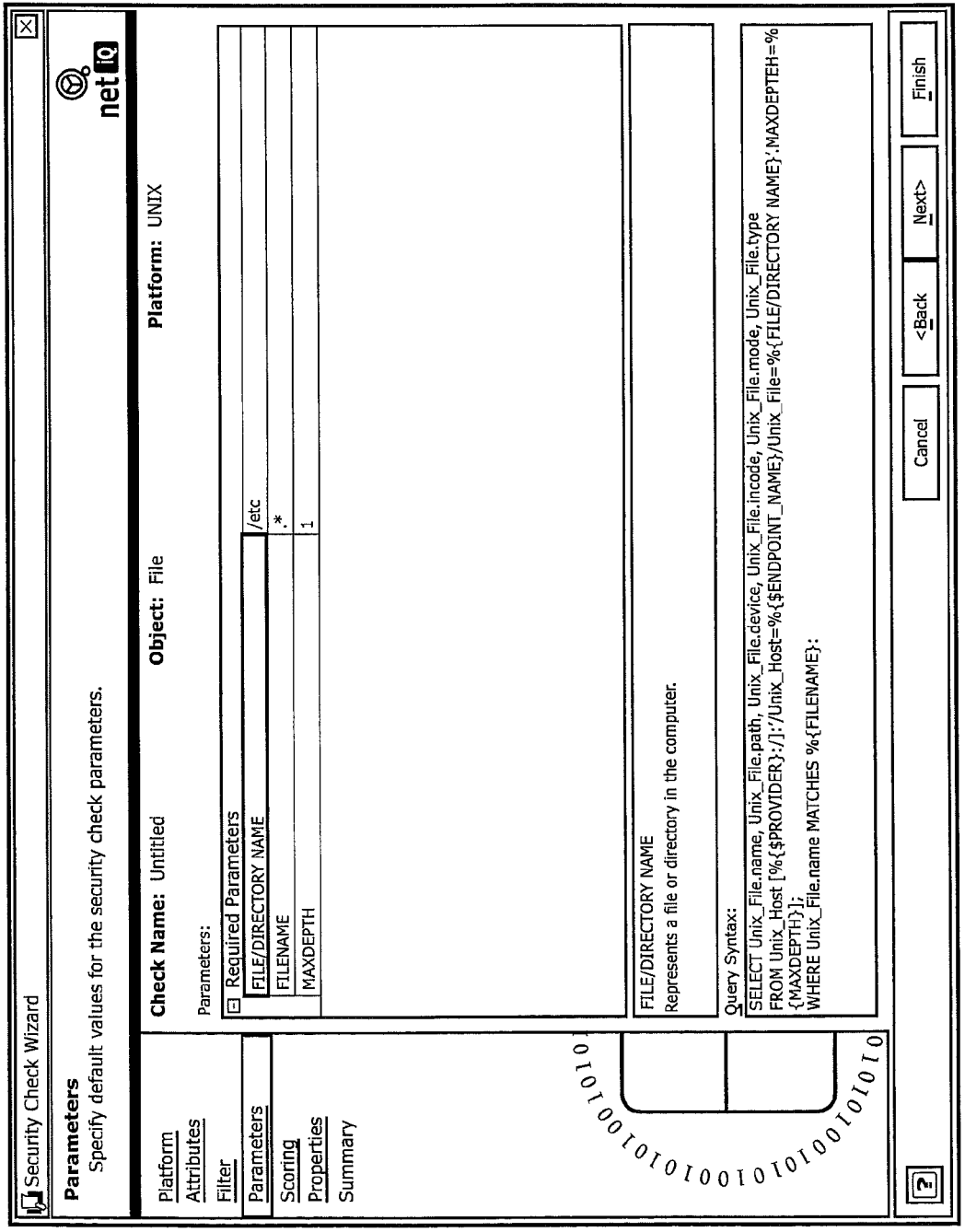
Figure 5:
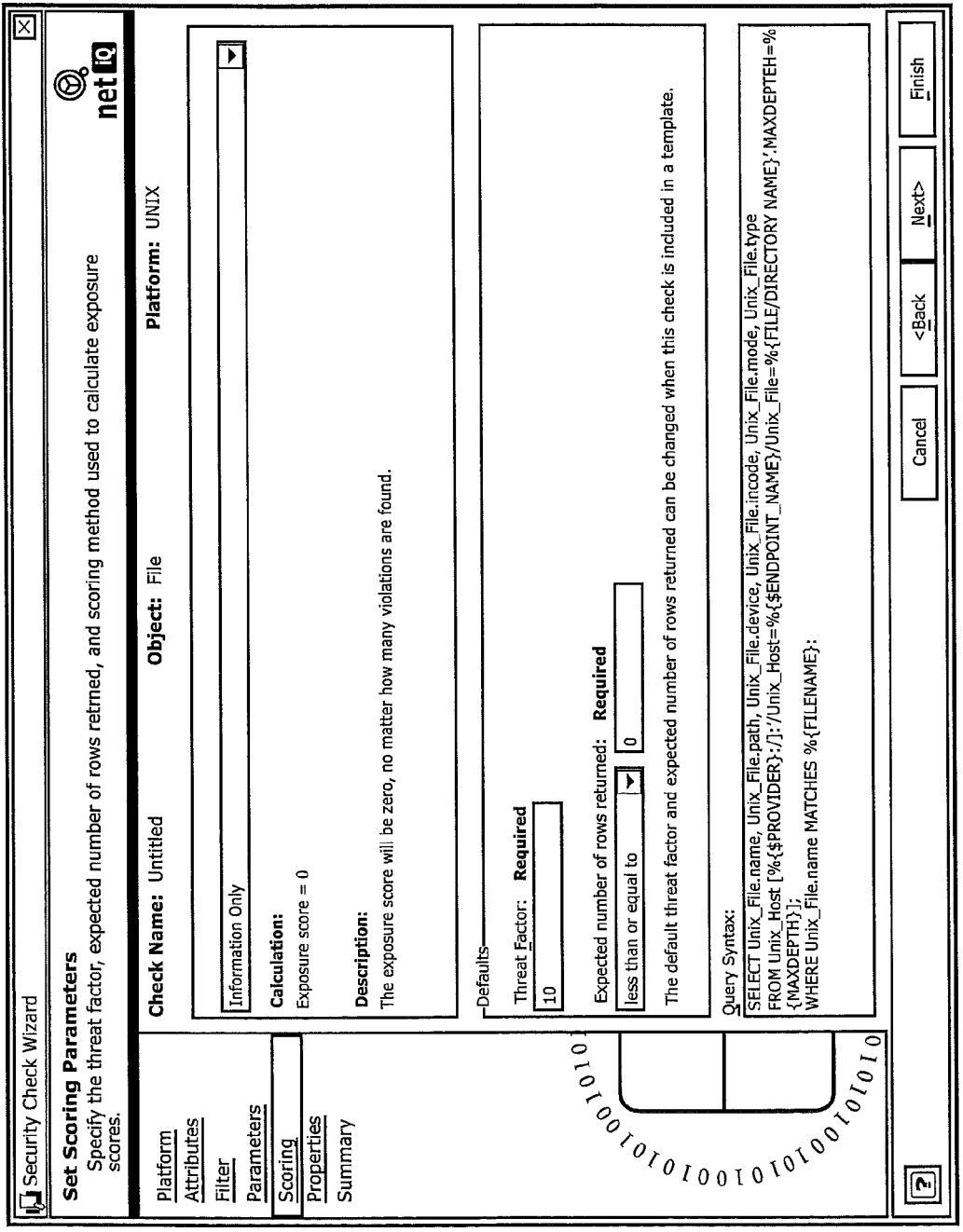
Figure 6:
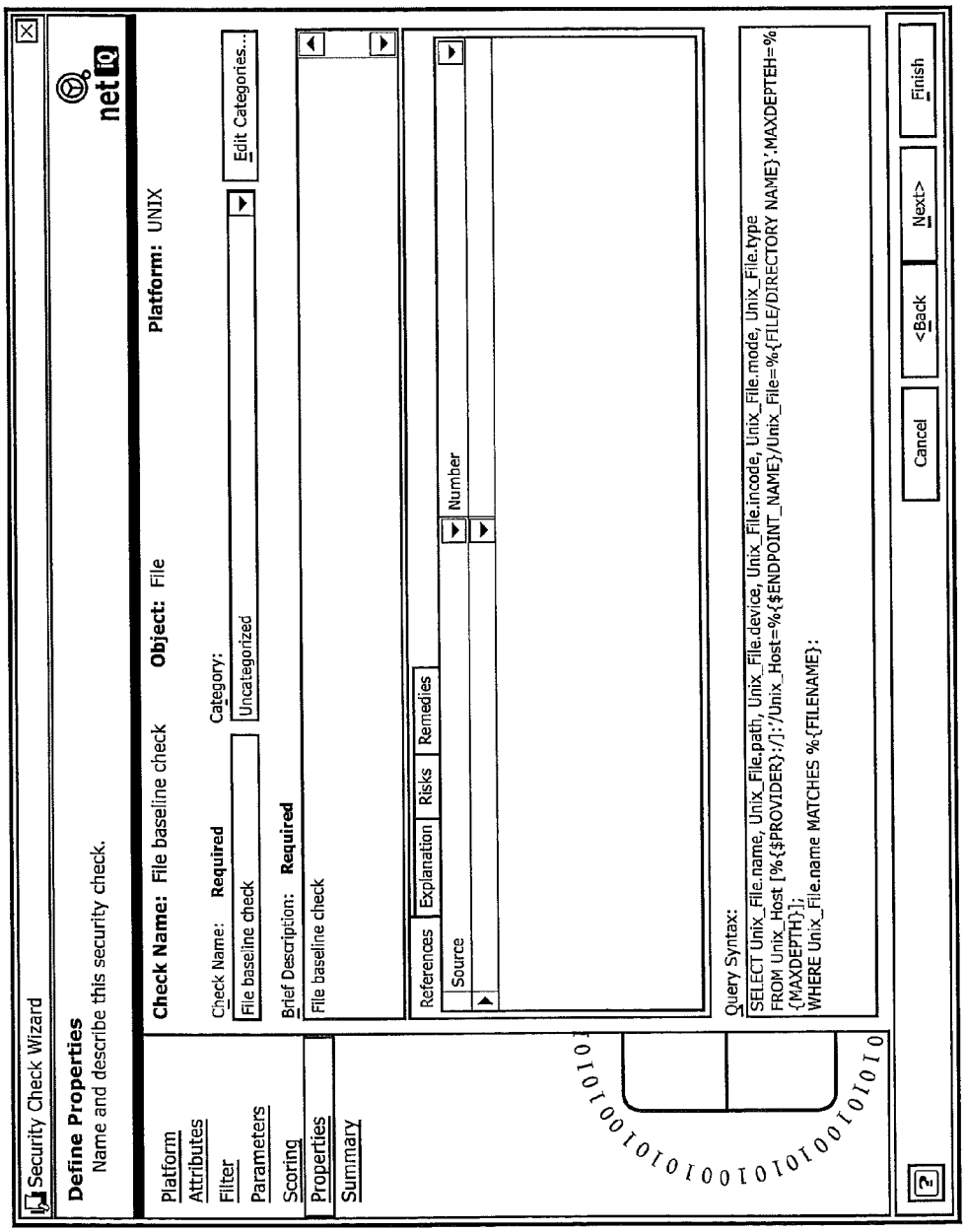
Figure 7:
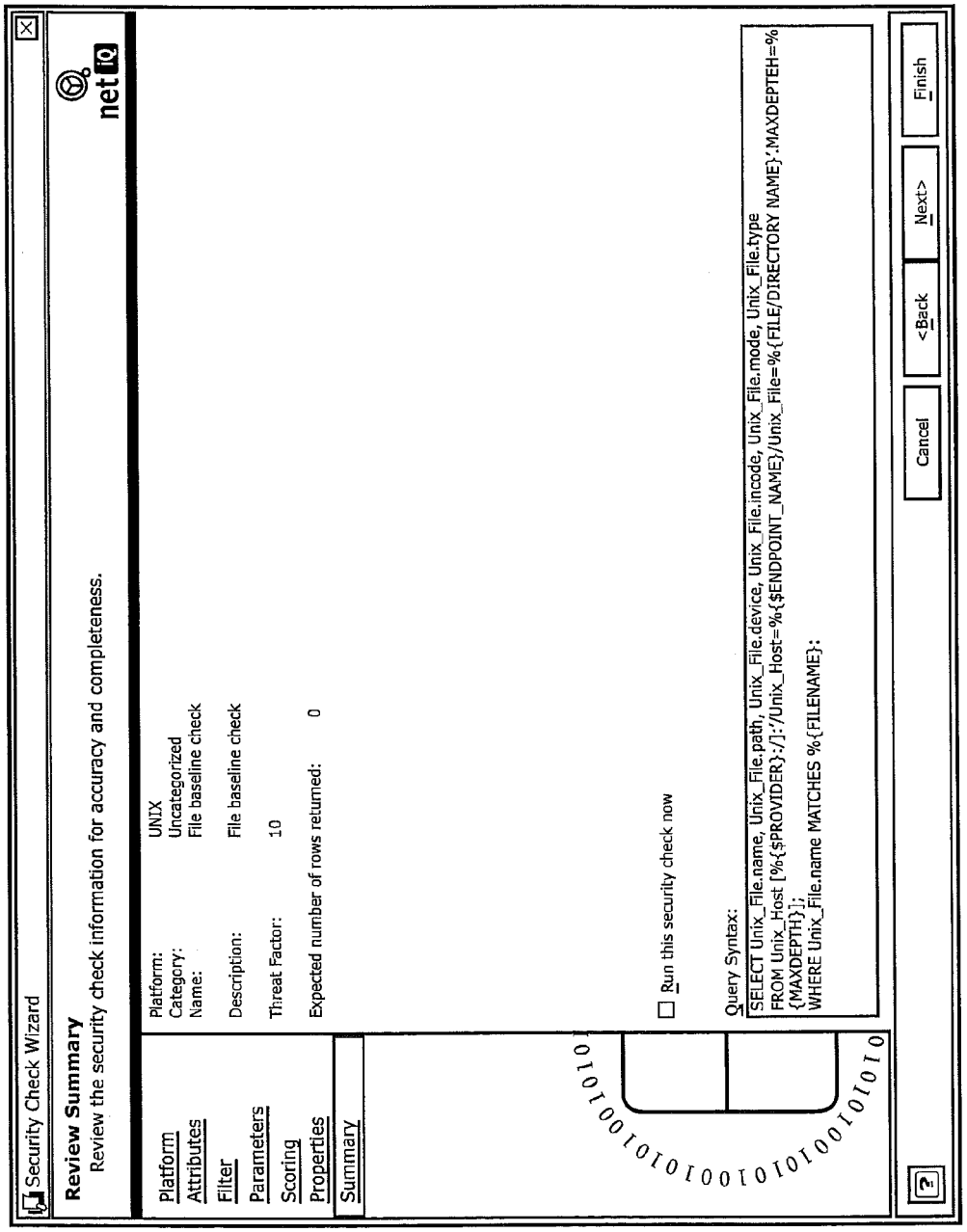

In some embodiments, the BP accesses data provided by the IP via a declarative object query capability (which may be intrinsic to the IP(s)). An example of a user interface for generating such an object query is illustrated in FIGS. 1 through 7. More particularly, FIGS. 1 through 7 illustrate some embodiments of graphic user interfaces (GUI) and methods for creating the baseline definition (BD). FIG. 1 illustrates a GUI that may be used to select the namespace provider and object for the BD. FIG. 2 illustrates a GUI that may be used to select the attributes of the namespace object to be used in the BD. FIG. 3 illustrates a GUI that may be used to define any where clause that will be used to narrow the BD contents. FIG. 4 illustrates a GUI that may be used to select initial parameters to define the BD contents. FIG. 5 illustrates a GUI that may be used to set scoring parameters. FIG. 6 illustrates a GUI that may be used to associate a name with the BD. FIG. 7 illustrates a GUI that provides a presentation of previously entered information for confirmation before saving.

At the completion of the baseline check process, the GUI may write a Tool Control Language (TCL) based check extensible markup language (XML) file, instead of a VigilEnt Query Language (VQL)(a declarative query language) based check XML file. An example XML file of the baseline check of FIGS. 1-7 is shown in TABLE 1. For the example XML file, all of the code is static except for the parameter lists, which may be separately generated, and the 3 lines specified in TABLE 1. All of the static code may be stored in a file, to allow for updates, and substituting the dynamic section with a metatag, to be replaced by the dynamic code that the GUI may insert.

TABLE 1 pragma REQUIRE ("VOSBaseline_1_1")
pragma TARGET_NAMESPACE ("vosbaselineprov")
instance of VOSBaseline_Policy
{
   parentPath = "/";
   name = "SystemFiles";
   policySortKeys = {"Windows_File.name"};
   policyQueryStatement = "select * FROM Windows_File (Windows:/Windows_Host=localhost/Windows_Dir=WINDOWS/Windows_Dir= system);";
   policyComparators = {"Windows_File.name=!",
"Windows_File.size=!", "Windows_File.createTime=!",
"Windows_File.modifyTime=!"};
};

A Baseline Definition (BD) may be established by a BD query against the BP (also referred to as BP module). A BD Query in some embodiments resembles an SQL statement, which selects a specific object type from the IP's information model, and retrieves instances that meet a specific set of criteria. Hence the BD can be extended without source modification and recompilation of the management product, for example, simply by extending the criteria on the BD query. An example of object types for selected network system types is provided in TABLE 2, including Windows, Unix, SQL-Server, Oracle, IIS and Apache object type examples. An example of a BD is shown in TABLE 3. In this approach, system administrators typically do not need to understand the internals of each of the disparate system elements in order to define desired states and to detect changes.

TABLE 2

This memo is an exemplary IP module objects list for Windows, Unix, SQL-Server, ORACLE, IIS and Apache.

| Object | Description |
| --- | --- |
| 1. Windows | |
| Windows_Workstation | Represents Windows servers and desktops |
| Windows_Domain | Represents Windows NT4 domains |
| Windows_ADDomain | Represents Active Directory domains |
| Windows_Passowrd | Represents passwords for user accounts |
| Windows_UserRight | Represents users rights |
| 2. Unix | |
| Unix_Host | Represents Unix computers |
| Unix_User | Represents Unix users |
| Unix_Group | Represents Unix groups |
| Unix_File | Represents Unix files and directories |
| Unix_Crontab | Represents crontab entries |
| 3. SQL-Server | |
| Vmsqlprovider_Server | Represents SQL server instances |
| Vmsqlprovider_Database | Represents database instances within a SQL server instance |
| Vmsqlprovider_table | Represents tables of database instances |
| Vmsqlprovider_ServerLogin | Represents user accounts in a database |
| 4. ORACLE | |
| Oracle_Endpoint | Represents ORACLE instances |
| Oracle_User | Represents ORACLE users |
| Oracle_Role | Represents ORACLE roles |
| Oracle_RolePrivs | Represents ORACLE role privileges |

TABLE 2-continued

This memo is an exemplary IP module objects list for Windows, Unix, SQL-Server, ORACLE, IIS and Apache.

| Object | Description |
|---|---|
| Oracle_Tables | Represents tables in an ORACLE database |
| Oracle_Views | Represents views in an ORACLE database |

5. IIS

| Object | Description |
|---|---|
| Vmiis_IISService | Represents Microsoft IIS service |
| Vmiis_IISApplicationPool | Represents IIS application pools in an IIS service |
| Vmiis_IISWebSite | Represents web sites within an IIS service |
| Vmiis_WebVitualDirectory | Represents virtual directories in an IIS service |
| Vmiis_IISFTPSite | Represents FTP sites in an IIS service |

6. Apache

| Object | Description |
|---|---|
| Apache_Host | Represents Apache servers |
| Apache_LModule | Represents loaded modules of an Apache server |
| Apache_VHost | Represents virtual hosts of an Apache server |

In the exemplary BD of TABLE 3, the BD monitors all files under the c:/system directory and looks for files whose "name" or "size" or "createTime" or "modifyTime" have changed and reports them. The query statement defines how to retrieve data from the IP (also referred to as IP module), which is VQL, an object query language. As shown in this example, a BD may be just an instance declaration, and it need not involve compilation.

TABLE 3

```
<CUSTOMCHECK TaskId="2000022" Schema="UNIX" Comparator="LE" EditorType="732" ScoringType="715" IsBuiltIn="True" xmlVersion="3">
    <NAME>File(s) Baseline Create</NAME>
    <VERSION>1</VERSION>
    <CATEGORY>Base Line</CATEGORY>
    <PLATFORM>UNIX</PLATFORM>
    <APPSCOPE>Servers</APPSCOPE>
    <BRIEFEXPLANATION>File(s) Baseline Create</BRIEFEXPLANATION>
    <EXPLANATION></EXPLANATION>
    <RISKS></RISKS>
    <REMEDIES></REMEDIES>
    <EXPECTEDVALUE Type="String">
        <UNITLABEL>None</UNITLABEL>
        <DEFAULT>0</DEFAULT>
    </EXPECTEDVALUE>
    <DEFAULTPENALTY>10</DEFAULTPENALTY>
    <PARAMETERS>
        <PARAMETER Type="String" IsDisplayed="True" IsEditable="False" OSScope="UNIX" GuiFlag="257">
            <NAME>POLICYNAME</NAME>
            <DESCRIPTION>Policy Name</DESCRIPTION>
            <INDEX>0</INDEX>
            <DEFAULT>policy1</DEFAULT>
        </PARAMETER>
        <PARAMETER Type="String" IsDisplayed="True" IsEditable="False" OSScope="UNIX" GuiFlag="272">
            <NAME>FILE/DIRECTORY NAME</NAME>
            <DESCRIPTION>Represents a file or directory in the computer.</DESCRIPTION>
            <INDEX>4</INDEX>
            <DEFAULT></DEFAULT>
        </PARAMETER>
        <PARAMETER Type="Integer" IsDisplayed="True" IsEditable="False" OSScope="UNIX" GuiFlag="256">
            <NAME>MAXDEPTH</NAME>
            <DESCRIPTION>Maximum number of levels to examine</DESCRIPTION>
            <INDEX>5</INDEX>
            <DEFAULT>1</DEFAULT>
        </PARAMETER>
        <PARAMETER Type="String" IsDisplayed="True" IsEditable="False" OSScope="UNIX" GuiFlag="257">
            <NAME>FILENAME</NAME>
            <DESCRIPTION>File Name</DESCRIPTION>
            <INDEX>0</INDEX>
            <DEFAULT>'.*'</DEFAULT>
        </PARAMETER>
        <PARAMETER Type="String" IsDisplayed="True" IsEditable="False" OSScope="UNIX" GuiFlag="257">
            <NAME>QUERY</NAME>
            <DESCRIPTION>query</DESCRIPTION>
            <INDEX>0</INDEX>
            <DEFAULT>SELECT Unix_File.name, Unix_File.path, Unix_File.device, Unix_File.inode,
```

TABLE 3-continued

```
Unix_File.mode, Unix_File.type FROM Unix_File
(%{$PROVIDER}:'/Unix_Host=%{$ENDPOINT_NAME}/Unix_File=%{FILE/DIRECTORY
NAME}', MAXDEPTH=%{MAXDEPTH}) WHERE Unix_File.name MATCHES
%{FILENAME};
</DEFAULT>
   </PARAMETER>
   <PARAMETER Type="String" IsDisplayed="True" IsEditable="False" OSScope="UNIX"
GuiFlag="257">
      <NAME>QUERYSORTKEYS</NAME>
      <DESCRIPTION>sortkeys</DESCRIPTION>
      <INDEX>0</INDEX>
      <DEFAULT>Unix_File.path</DEFAULT>
   </PARAMETER>
   <PARAMETER Type="String" IsDisplayed="True" IsEditable="False" OSScope="UNIX"
GuiFlag="257">
      <NAME>QUERYCOMPARATORS</NAME>
      <DESCRIPTION>comparators</DESCRIPTION>
      <INDEX>0</INDEX>
      <DEFAULT>Unix_File.size=! Unix_File.modificationtime=!</DEFAULT>
   </PARAMETER>
</PARAMETERS>
<QUERY Type="TCL"><![CDATA[
vsSource vigilent_vosscriptlib.tcl

get policy name

if { [string is alnum $vsArgV(POLICYNAME)] } {
    set policyname "$vsArgV(POLICYNAME)_$vsArgV(_ENDPOINT_NAME)"
} else {
    set err [vsAttrList new]
    vsAttrList setAttribute err "errorMsg string \"Policy name must contain only alphanumeric
characters\""
    vsException err
}

set policy query statement and comparators

set policyQueryStatement   $vsArgV( QUERY )
set policySortKeys         $vsArgV( QUERYSORTKEYS )
set policyComparators      $vsArgV( QUERYCOMPARATORS )
set provider $vsArgV(_PROVIDER)
set endpointName $vsArgV(_ENDPOINT_NAME)

replace parameter tokens with acutal values.

regsub {%\{\$PROVIDER\}} $policyQueryStatement $provider policyQueryStatement
regsub {%\{\$ENDPOINT_NAME\}} $policyQueryStatement $endpointName
policyQueryStatement
```

1.0 Start of Dynamicly Generated Code.

```
regsub {%\{FILE/DIRECTORY NAME\}} $policyQueryStatement
[vigilentEscapeObjectName $vsArgV(FILE/DIRECTORY NAME)]
policyQueryStatement
regsub {%\{MAXDEPTH\}} $policyQueryStatement
$vsArgV( MAXDEPTH) policyQueryStatement
regsub {%\{FILENAME\}} $policyQueryStatement
$vsArgV( FILENAME ) policyQueryStatement
```

End of dynamic code.

```
regsub {,} $policySortKeys " " policySortKeys
regsub {,} $policyComparators " " policyComparators

create new result set for return

set result [vsQuery new]

create connection to baseline provider

set blineprovider "vosbaselineprov"
if {[catch {vsCreateProviderContext 0 $blineprovider} pCon]} {
    set err [vsAttrList new]
    vsAttrList setAttribute err "errorMsg string \"cannot create local
provider context to $blineprovider: $pCon\""
    vsException err
}

create policy object

```

-continued

```
set policyAttrs [vsAttrList new]
vsAttrList setAttribute policyAttrs "{policyQueryStatement}
string {$policyQueryStatement}"
vsAttrList setAttribute policyAttrs "{policySortKeys}
string-array {$policySortKeys}"
vsAttrList setAttribute policyAttrs "{policyComparators}
string-array {$policyComparators}"
if {[catch {vsCreateObject $pCon "/" $policyname
"VOSBaseline__Policy" policyAttrs }]} {
  set err [vsAttrList new]
  vsAttrList setAttribute err "errorMsg string \"cannot create object
    $policyname\""
  vsException err
}

create baseline snapshot

set inAttrs [vsAttrList new]
if {[catch {vsExecute $pCon "/VOSBaseline__Policy=$policyname"
"Create" inAttrs } qResult ]}
{
if create snapshot fails, remove the policy.
if {[catch {vsDestroyObject $pCon "/" $policyname
"VOSBaseline __Policy" }]} {
}
  set err [vsAttrList new]
  vsAttrList setAttribute err "errorMsg string \"cannot create snapshot
    $policyname: $qResult\""
  vsException err
}

return snapshot result, i.e. nothing

return $result
]]></QUERY>
</CUSTOMCHECK>
```

When defining desired states or baselines of system elements (objects), administrators may always work with a uniform representation of the system elements in some embodiments of the present invention as described above. As a result, the disparity of different system elements may be hidden by the information models.

As a result, some embodiments of the present invention may reduce or even eliminate the need for repeating the development of systems that support defining baselines and detecting changes for each type of disparate system elements. Instead, a common implementation that supports defining baselines and detecting changes is applied to different types of system elements via the information models that represent these elements. The saving of software development, testing, deployment and maintenance efforts may become significant, for example, when the number of the disparate types of system elements grows large.

Some embodiments of the present invention allow the definition of baseline (i.e. desired states of system elements) to be generalized. As such, the BP functionality can be extended to other items of interest with little or no modification of the BP. Instead, only the information model may be extended to cover the new system element, and baseline processing may then become available for them, easily configured by the user, with no further effort.

As the number of types of disparate system elements grows in enterprise IT environments, it will generally become clearer that a scalable way of defining and maintaining desired states of system elements is beneficial. The cost of repeated system development to achieve this capability for each type of system elements is time consuming and may become cost prohibitive. In other words, having to re-compile and re-design the application is generally painful. However, some embodiments of the present invention may address this issue by merely adding a new object, and the object could then be queried transparently from remote locations.

For example, in some embodiments of the present invention, operations may proceed as follows:

1. Use IP to generate a list of objects in a generic representation. (IP can be used to query the generic objects).
2. BP defines a baseline via a BD query—this query can consist of different elements such as Users, File Permissions, Open Ports, Processes, etc).
3. BP issues a BD query to IP consisting of Users and File Permissions.
4. IP gathers the information and returns the object instances reflecting the results of the query.
5. BP stores the results to a database. This becomes the baseline snapshot, which can be compared against at a later time to see changes in the configuration that have occurred.
6. Later, the system administrator decides they wish to extend the baseline definition to also monitor Open Ports.
7. The system administrator defines a 'new' BD by extending the current BD with additional elements.
8. BP issues the new BD query to IP.
9. The IP gathers the information (now including the open ports) and returns the results to the BP
10. The BP stores these results as the new baseline snapshot.

In other words, the query from the BP to the IP may ask about a device class and the IP may pick the appropriate model to invoke to get data from the particular system device responsive to the query. Received data may be reformatted by the IP to the model and then the results may be returned to the BP. As such, the IP models invoked responsive to a BP query may be device specific (e.g., an API designation), while the BP query may be formatted for the defined IP model and not dependent on or including device/object specific details. This transparency may be provided both in the query direction and in the data return direction of information flow in that the IP may also remove device/object specific aspects from the data in converting the data to the model format know to the BP. As such, only the IP models need to be modified to accommodate new objects and the BP need not be modified or re-compiled, in contrast to the Tripwire Enterprise approach described in the background section above.

Figure 8:
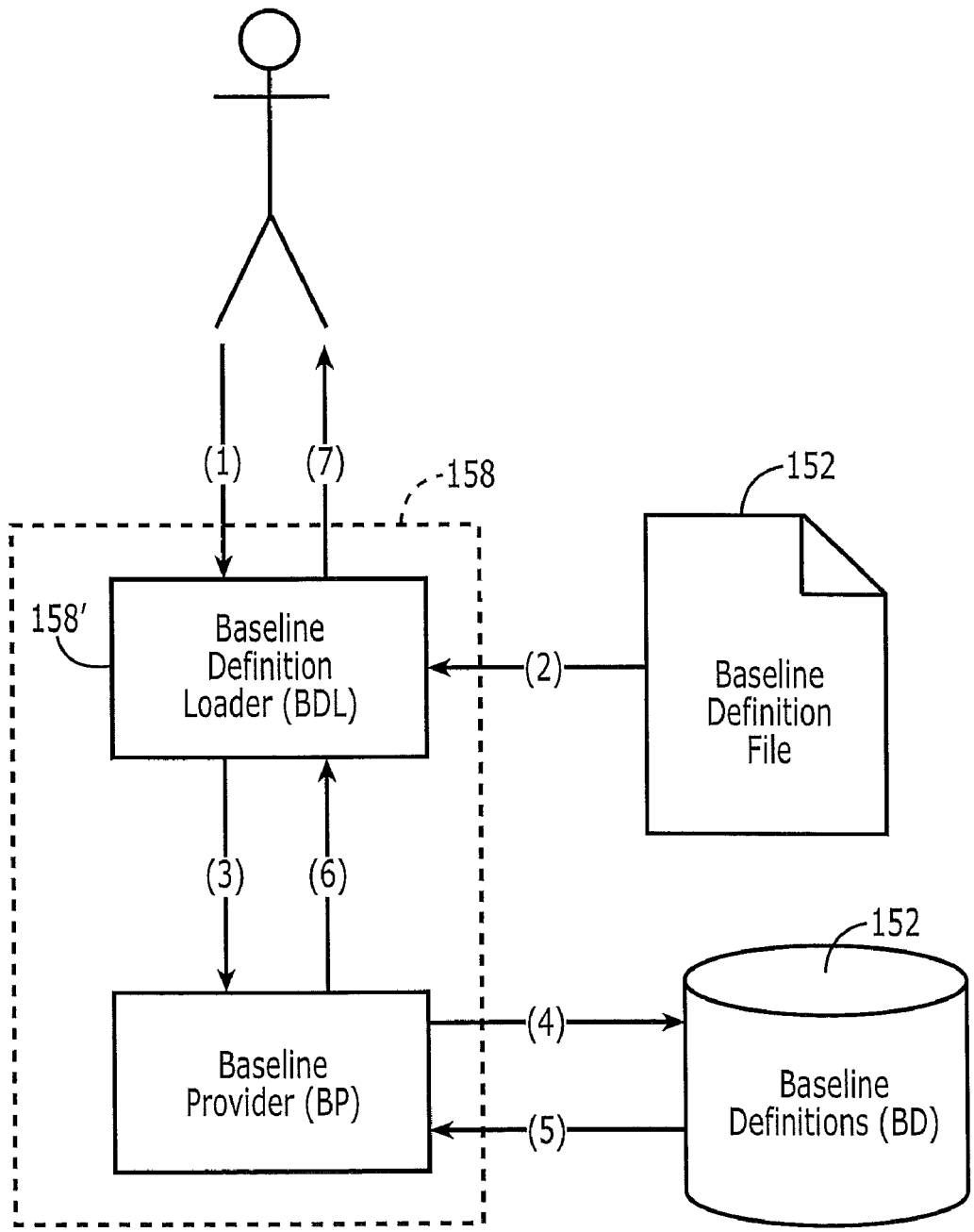
FIGS. 8-17 are block diagrams and flow charts illustrating obtaining configuration information using an information provider and a baseline provider according to some embodiments of the present invention.
Figure 9:
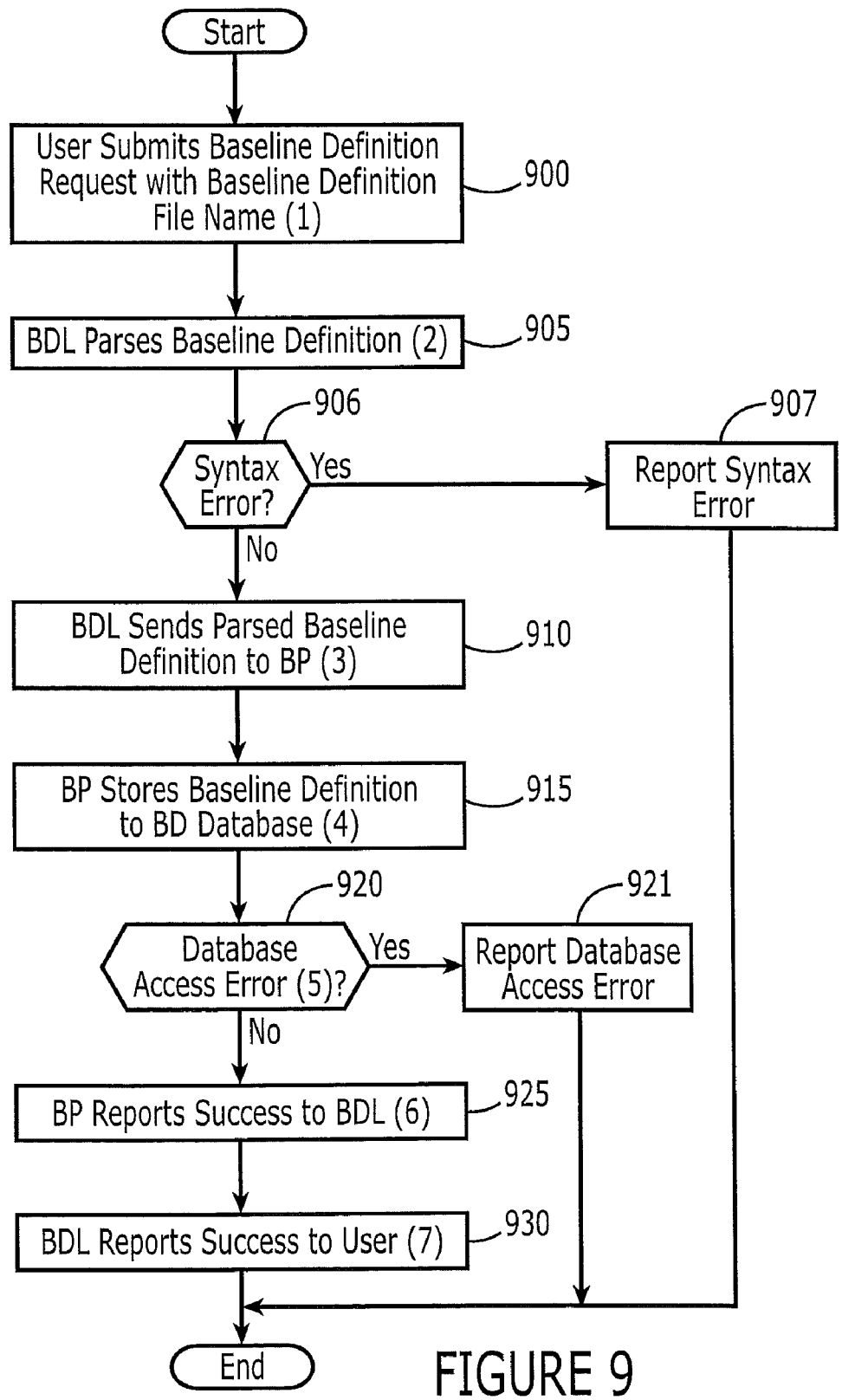

Some embodiments of the present invention will now be further described with reference to FIGS. 8-17. The flow chart and block diagram illustrations of FIG. 8-17 illustrate the architecture, functionality, and operations of some embodiments of methods, systems, and computer program products for monitoring system object changes on a network that may include disparate elements using information models and baselines. FIGS. 8 and 9 illustrate operations and corresponding dataflows for loading a baseline definition (BD) to the system by a user according to some embodiments. The numbered flows illustrated in the block diagram of FIG. 8 correspond to the like numbered operational blocks in the flow chart illustration of FIG. 9.

More particularly, the following operations are illustrated in the embodiments of FIGS. 8 and 9: (1) The user invokes the baseline definition loader (BDL) 158' with the name of a baseline definition file (block 900); (2) BDL reads the contents of the baseline definition file, parses the baseline definition (blocks 905-907); (3) BDL sends the parsed baseline definition to the Baseline Provider (BP) 158 (block 910); (4)

BP stores the baseline definition to the Baseline Definitions (BD) database 152 (block 915); (5) BD replies to BP regarding the status of storing the baseline definition to the BD database (blocks 920-921); (6) BP replies to BDL regarding the status of storing the baseline definition to the BD database (block 925); and (7) BDL reports the status of storing the baseline definition to the BD database to the user (block 930).

Figure 10:
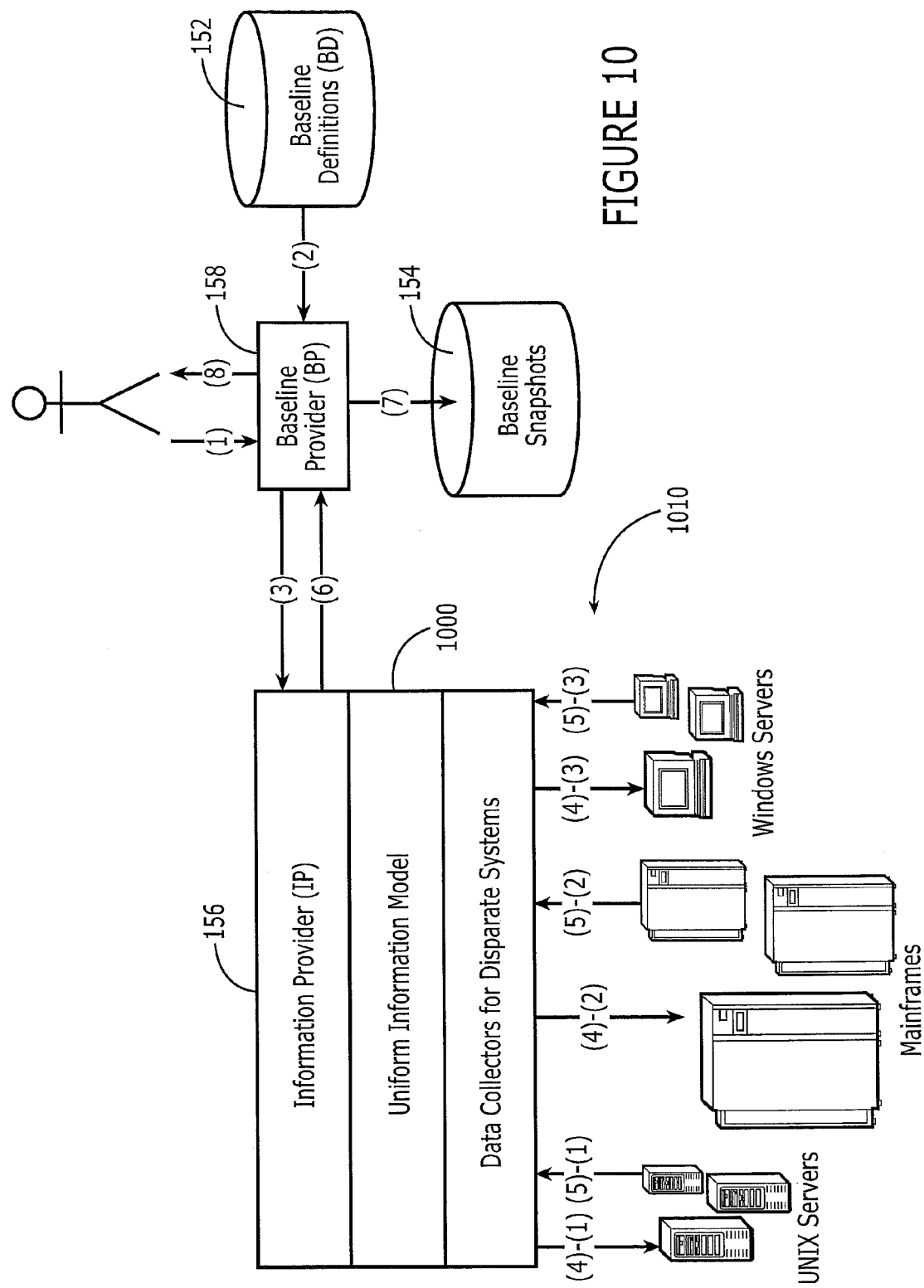
Figure 11:
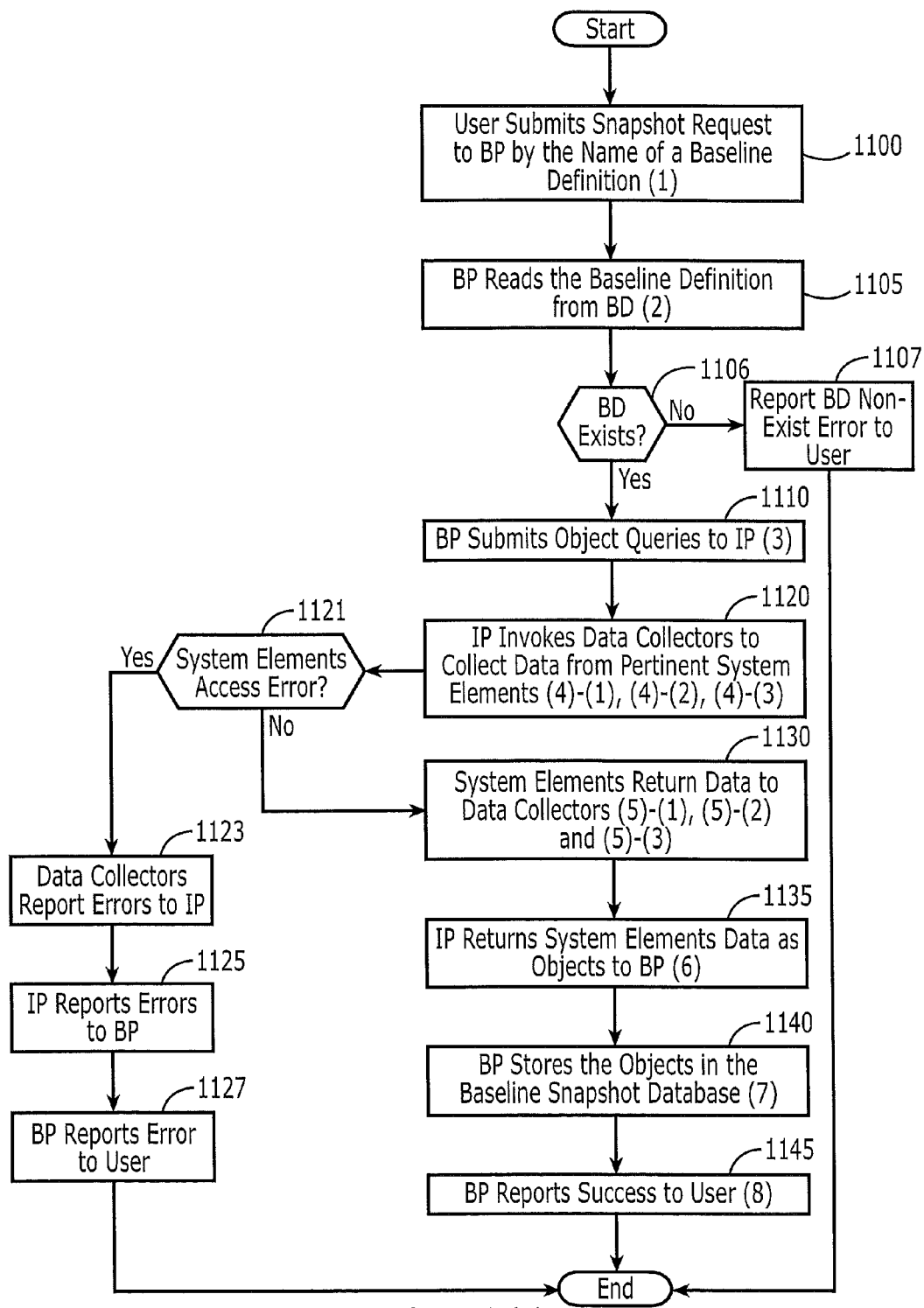

Operations and dataflows associated with creating a basedline snapshot will now be described with reference to the embodiments illustrated in FIGS. 10 and 11. FIG. 10 is a block diagram illustrating dataflows and FIG. 11 is a flow chart illustrating corresponding operations for creating a baseline snapshot for some embodiments. The numbered flows illustrated in FIG. 10 correspond to the like numbered operational blocks in the flow chart illustration of FIG. 11.

More particularly, the following operations are illustrated in the embodiments of FIGS. 10 and 11: (1) User submits a snapshot request to BP 158 by the name of a baseline definition (BD) (block 1100); (2) BP reads the baseline definition (BD) from the BD database 152 (blocks 1105-1107); (3) The BP 158 submits object queries to IP 156 based on the read BD (block 1110); (4) Based on the object types of the queries, IP invokes various data collectors 1010 via the uniform information model 1000 implemented by the data collectors 1010 (blocks 1120-1127); (5) Data collectors retrieve data from the system elements and return them to IP as objects (block 1130); (6) IP returns the objects to BP (block 1135); (7) BP stores the objects as a snapshot of the BD named at (1) (block 1140); and (8) BP reports the result to the user (block 1145).

Note that, in FIG. 10, three kinds of data collectors 1010 are shown and three invoking data flows (4)-(1), (4)-(2), (4)-(3). Similarly, three corresponding retrieved data collector return data flows (5)-(1), (5)-(2), (5)-(3) are shown. However, data collectors for other types of system elements can be added to the system as long as they conform to the uniform information model and a lesser number of data collectors may be invoked.

Figure 12:
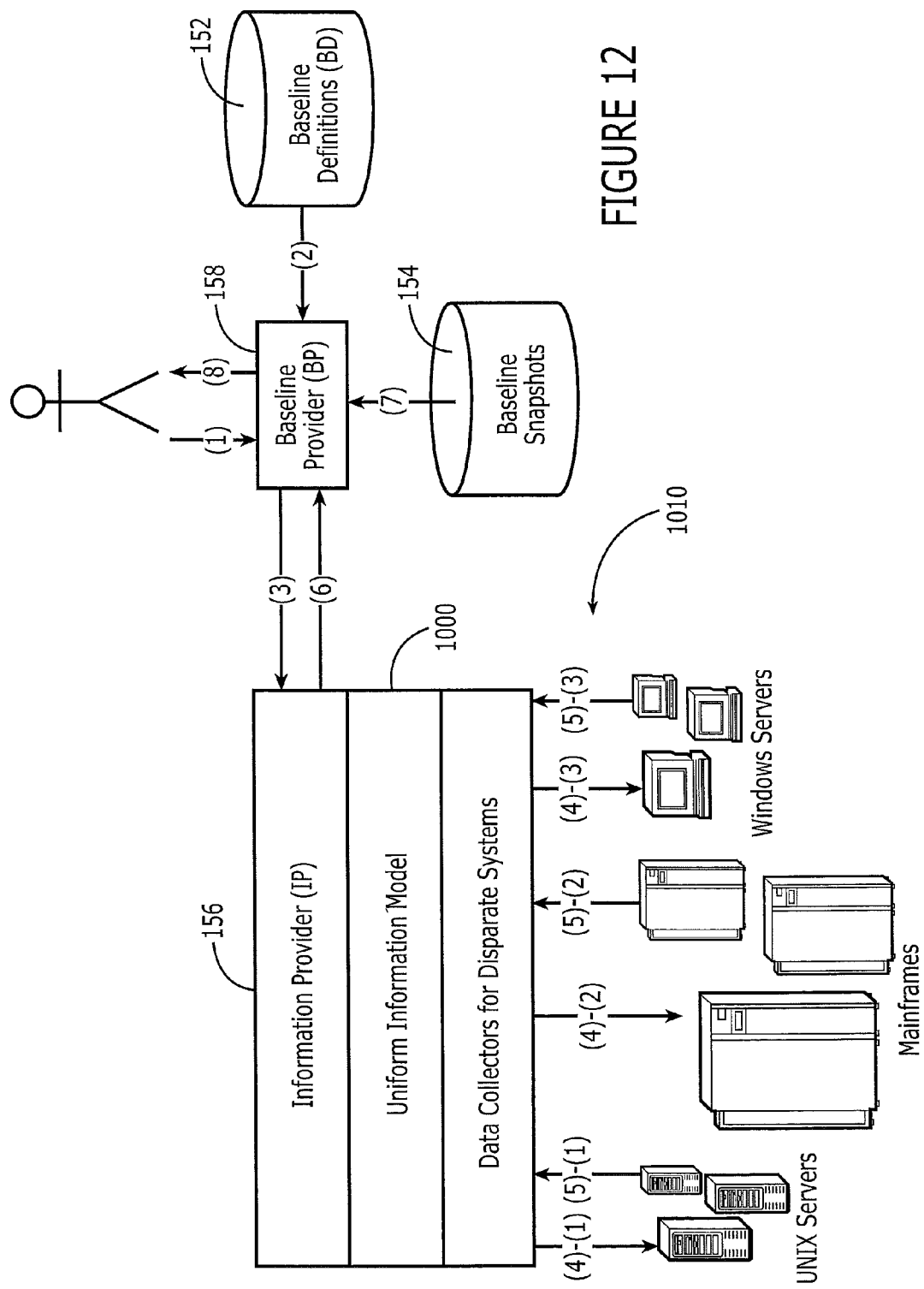
Figure 13:
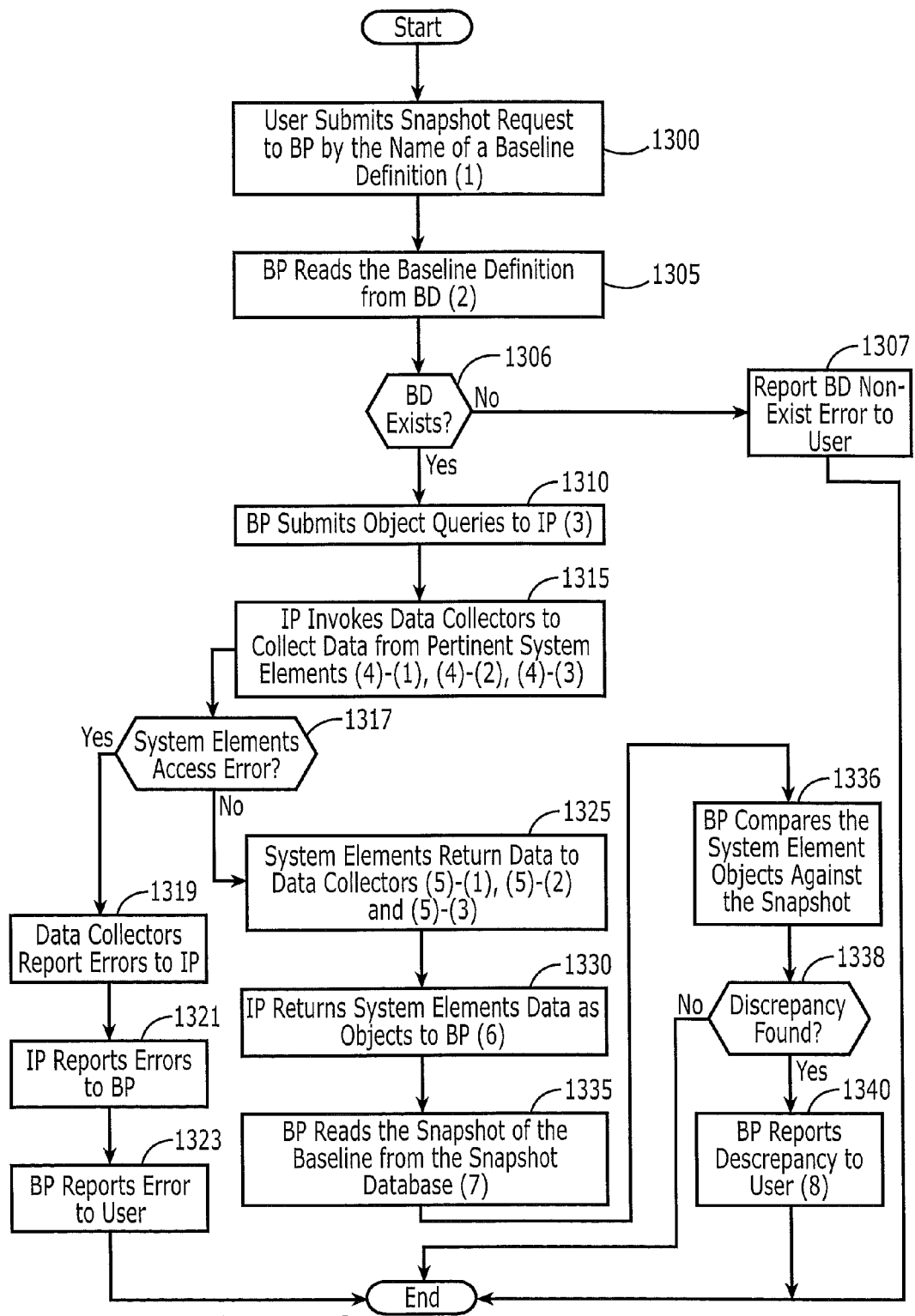

Operations and dataflows associated with generating a baseline report will now be described with reference to the embodiments illustrated in FIGS. 12 and 13. FIG. 12 is a block diagram illustrating dataflows and FIG. 13 is a flow chart illustrating corresponding operations for generating a baseline report for some embodiments. The numbered flows illustrated in FIG. 12 correspond to the like numbered operational blocks in the flow chart illustration of FIG. 13.

More particularly, the following operations are illustrated in the embodiments of FIGS. 12 and 13: (1) User submits a baseline report request to BP 158 by the name of a baseline definition (BD) (block 1300); (2) BP 158 reads the baseline definition (BD) from the BD database 152 (blocks 1305-1307); (3) According to BD, BP submits object queries to IP 156 (block 1310); (4) Based on the object types associated with the queries, IP 156 invokes various data collectors 1010 via the uniform information model 1000 implemented by the data collectors 1010 (blocks 1315-1323); (5) Data collectors 1010 retrieve data from the system elements and return them to IP 156 as objects (block 1325); (6) IP 156 returns the objects to BP 158 (block 1330); (7) BP reads the snapshot of the baseline corresponding to the BD named at (1) and compares it to the objects that are obtained at (6) (blocks 1335-1338); and (8) If discrepancies are found between the snapshot and the objects, BP 158 reports the discrepancies to user (block 1340).

As with FIGS. 10 and 11, note that, in FIG. 12, three kinds of data collectors 1010 are shown and three invoking data flows (4)-(1), (4)-(2), (4)-(3). Similarly, three corresponding retrieved data collector return data flows (5)-(1), (5)-(2), (5)-(3) are shown. However, data collectors 1010 for other types of system elements can be added to the system as long as they conform to the uniform information model 1000 and a lesser number of data collectors may be invoked.

Figure 14:
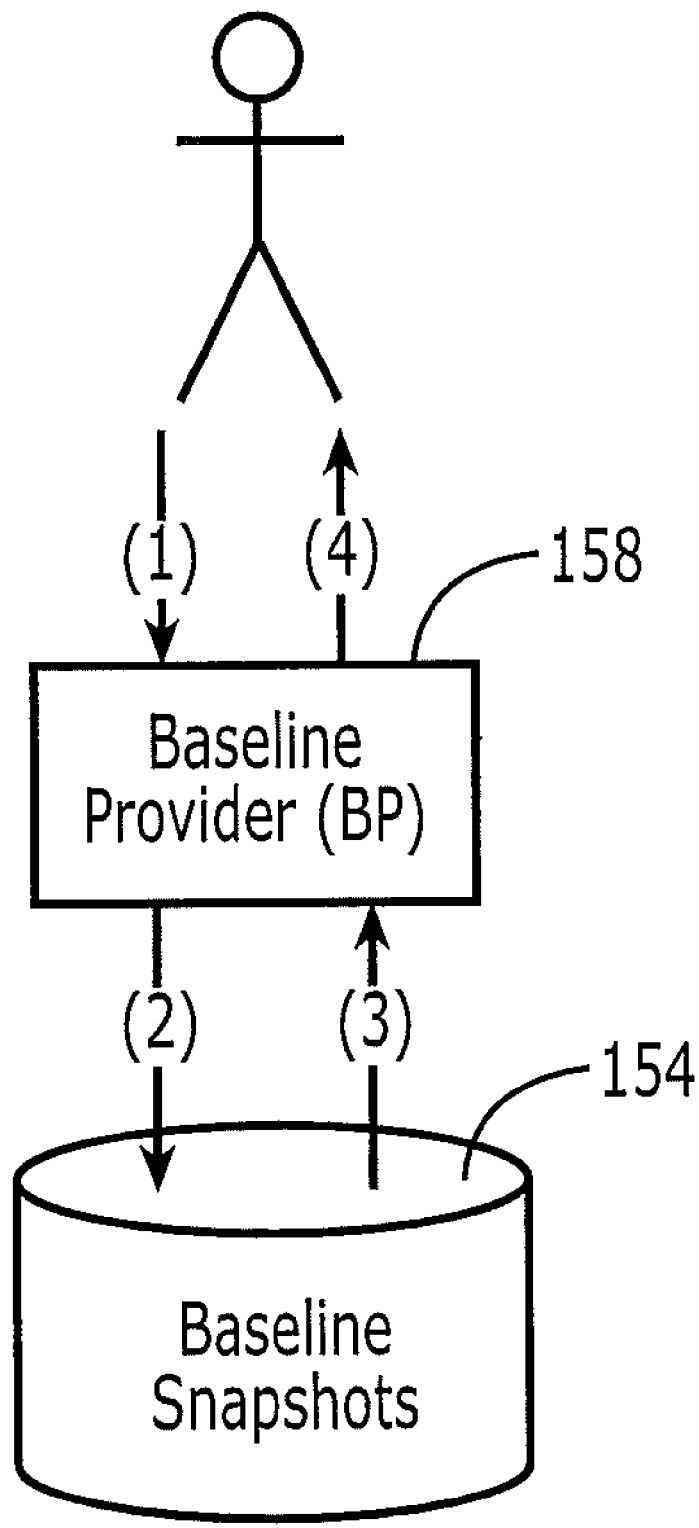
Figure 15:
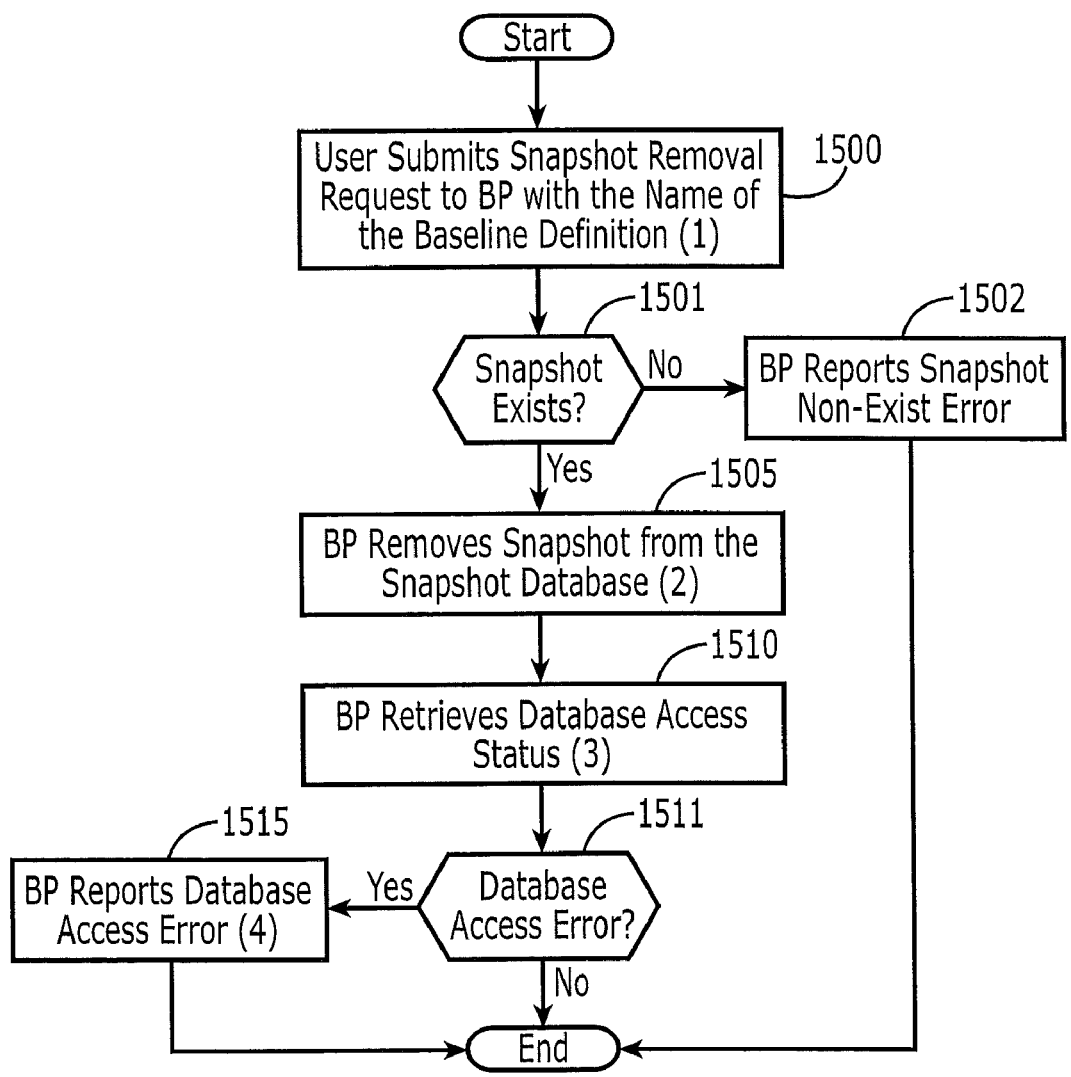

Operations and dataflows associated with removing a baseline snapshot will now be described with reference to the embodiments illustrated in FIGS. 14 and 15. FIG. 14 is a block diagram illustrating dataflows and FIG. 15 is a flow chart illustrating corresponding operations for removing a baseline snapshot for some embodiments. The numbered flows illustrated in FIG. 14 correspond to the like numbered operational blocks in the flow chart illustration of FIG. 15.

More particularly, the following operations are illustrated in the embodiments of FIGS. 14 and 15: (1) User submits a snapshot removal request to BP 158 with the name of the baseline definition (BD) (blocks 1500-1502); (2) BP 158 removes the snapshot from the snapshot database 154 (block 1505); (3) BP 158 obtains the status of snapshot removal (blocks 1507-1511); and (4) BP 158 reports the status of snapshot removal to user (block 1515).

Figure 16:
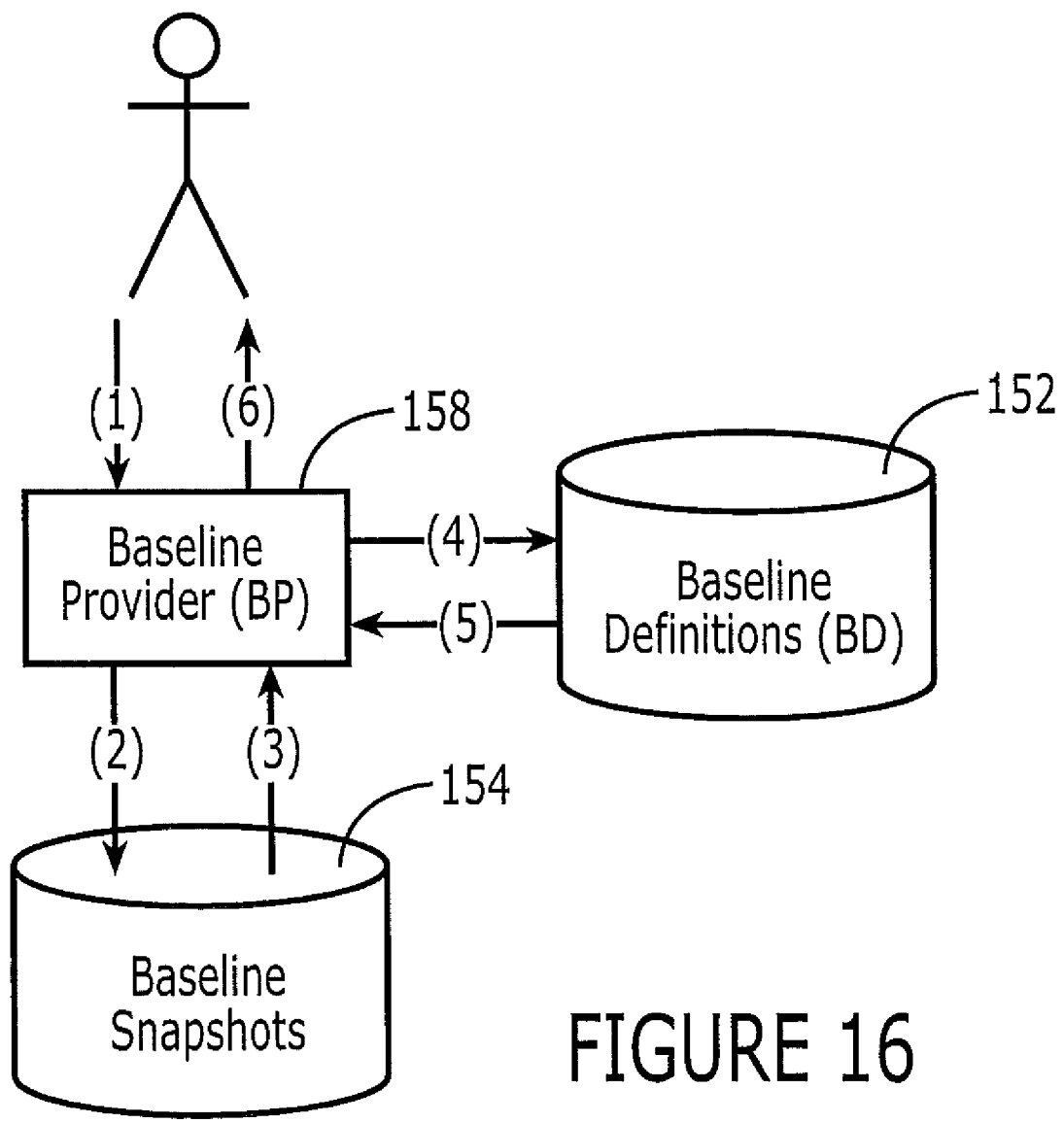
Figure 17:
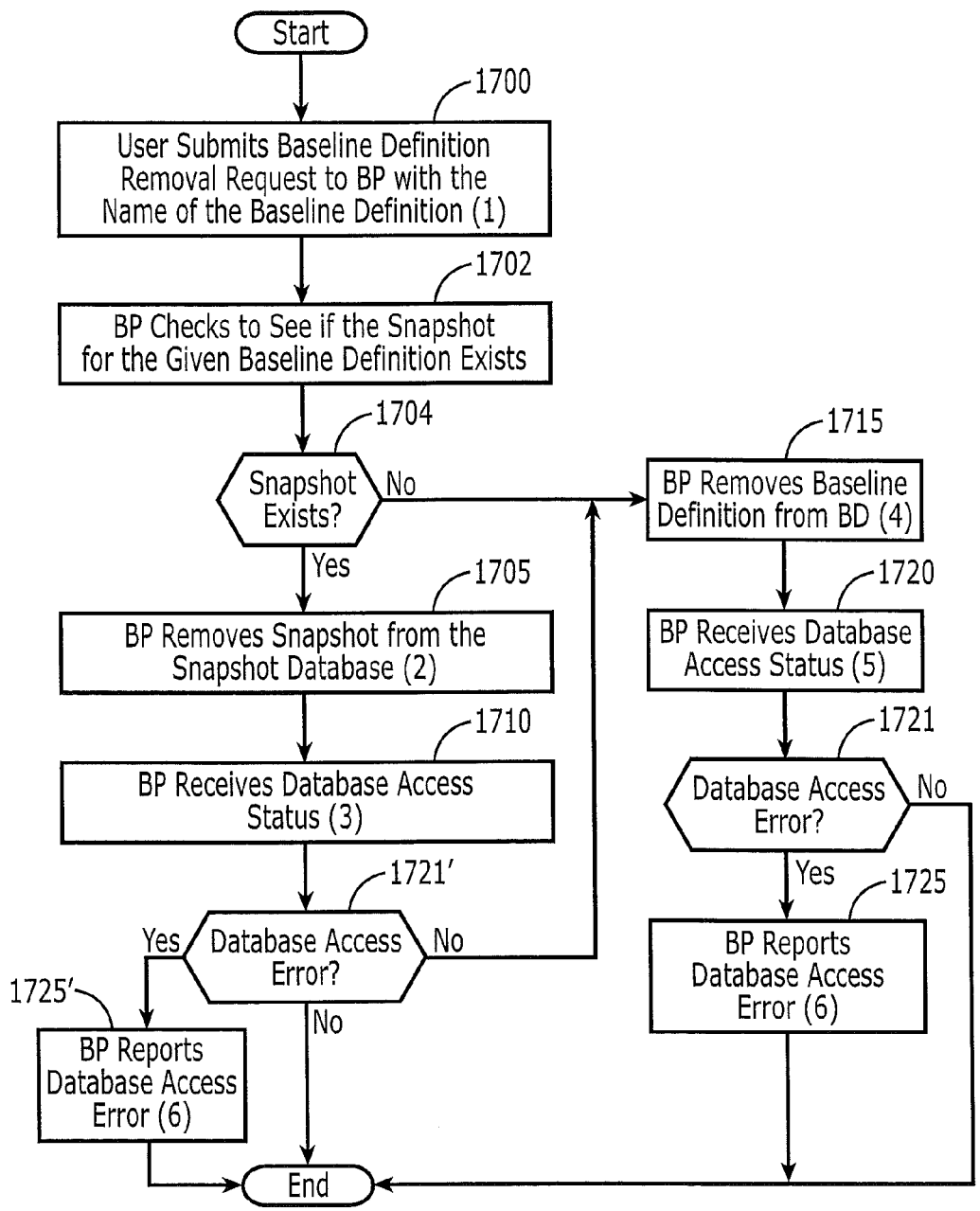

Operations and dataflows associated with removing a baseline definition will now be described with reference to the embodiments illustrated in FIGS. 16 and 17. FIG. 16 is a block diagram illustrating dataflows and FIG. 17 is a flow chart illustrating corresponding operations for removing a baseline definition for some embodiments. The numbered flows illustrated in FIG. 16 correspond to the like numbered operational blocks in the flow chart illustration of FIG. 17.

More particularly, the following operations are illustrated in the embodiments of FIGS. 16 and 17: (1) User submits a baseline definition removal request to BP 158 with the name of the baseline definition (block 1700); (2) BP 158 removes the snapshot of the BD if the snapshot exists (blocks 1702-1705); (3) BP 158 obtains the status of removing the snapshot of the BD and, if the status indicates error, BP 158 reports the error to user and finishes the procedure (blocks 1710, 1721', 1725'); (4) BP 158 removes the baseline 1725, 1725' definition (BD) from the baseline definition database 152 (block 1715); (5) BP 158 obtains the status of removing the baseline definition (BD) (blocks 1720-1721); and (6) BP 158 reports the status of removing the baseline definition (BD) to user (block 1725).

Figure 18:
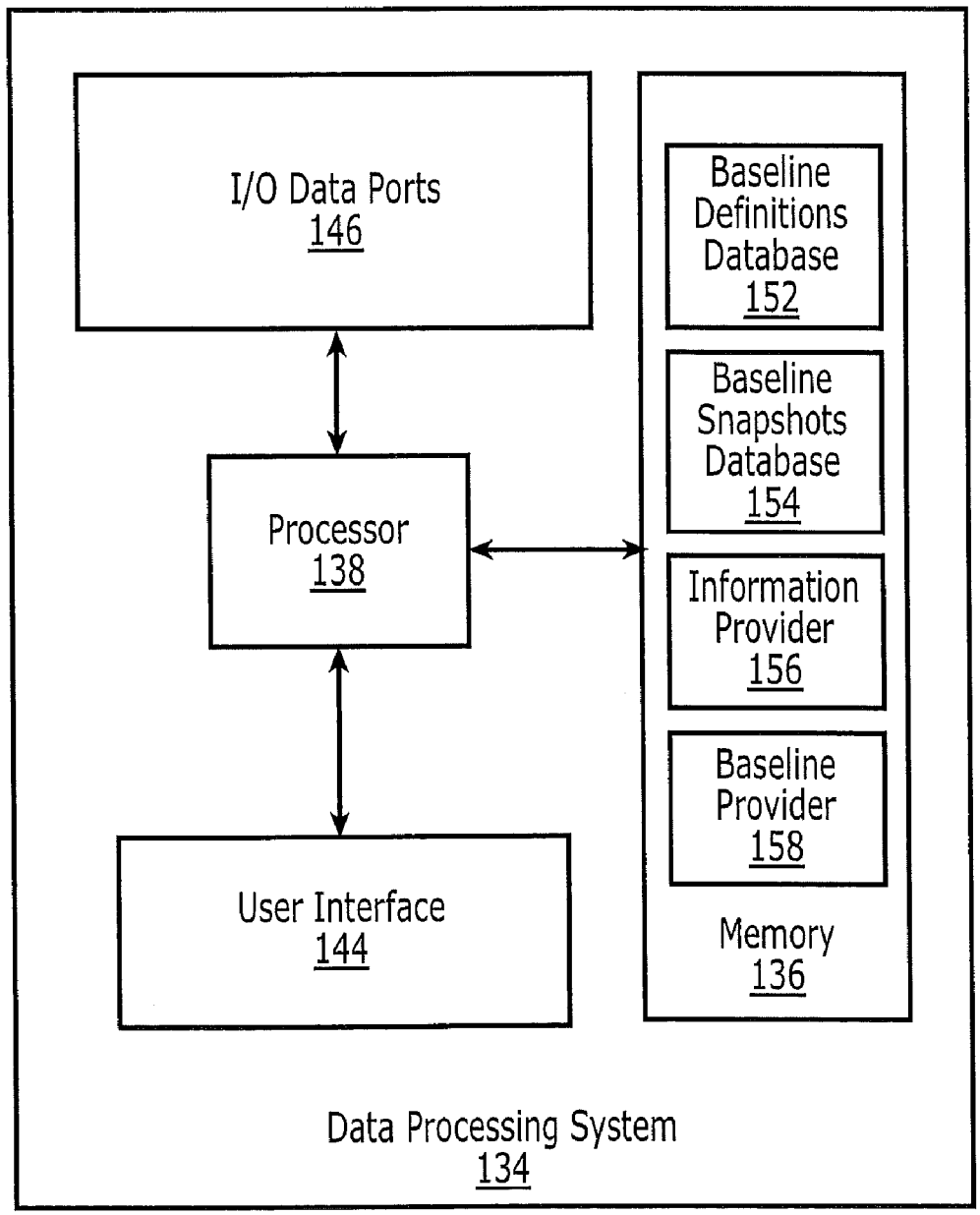
FIG. 18 is a block diagram of a data processing system suitable for use as a system for monitoring changes in objects on a computer system according to some embodiments of the present invention.
Figure 19:
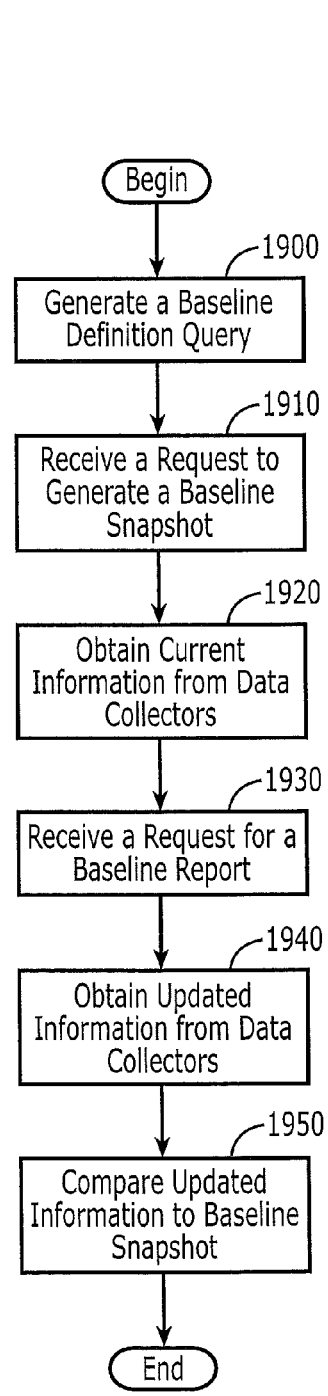
FIGS. 19-22 are flow charts illustrating operations for monitoring changes in objects on a computer system according to some embodiments of the present invention.

Referring now to FIG. 18, an exemplary embodiment of devices, for example, a personal computer system or the like or other data processing system 134, configured as a system for monitoring changes in objects on a computer system in accordance with some embodiments of the present invention will be discussed. The data processing system 134, which may be incorporated in, for example, a personal computer, a networked computer, or the like, may include a user interface 144, including, for example, input device(s) such as a keyboard or keypad, a display, a speaker and/or microphone, and a memory 136 that communicate with a processor 138. The data processing system 134 may further include an I/O data port(s) 146 that also communicates with the processor 138. The I/O data ports 146 can be used to transfer information between the data processing system 134 and another computer system or networks that may be associated with a communications service provider or user communication devices using, for example, an Internet Protocol (IP) connection. These components may be conventional components, such as those used in many conventional data processing systems, which may be configured to operate as described herein.

As shown in the embodiments of FIG. 18, the memory 136 includes a baseline definitions database 152, a baseline snapshots database 154, an information provider module (IP) 156 and a baseline provider module (BP) 158. The baseline definitions database 152 includes a plurality of baseline definition queries. Baseline definition queries are configured to generate baseline snapshots of a plurality of objects having associated object types and corresponding attributes specified in the corresponding one of the baseline definition queries. In some embodiments, at least one object has an object type not managed by a file system of the computer system being monitored. In some embodiments, the object types and attributes are specified using terms defined by a uniform information model.

The baseline snapshots database 154 includes a plurality of baseline snapshots. The stored baseline snapshots are generated based on corresponding ones of the baseline definition queries. In other words, one or more distinct baseline snapshot may be provided for each baseline definition query.

The baseline provider module 158 is configured to obtain current information from a plurality of data collectors 1010 (FIG. 12) to determine the attributes of the plurality of objects so as to generate the baseline snapshots. In other words, the baseline provider module 158 is configured to use the baseline definition queries in the baseline definitions database 152 to obtain attribute information about instances of specified object types and use such obtained information to develop a corresponding baseline snapshot for storage in the baseline snapshots database 154. The baseline provider module 158 is configured to obtain updated information from the plurality of data collectors to update the determined attributes of the objects and to compare the baseline snapshots to the obtained updated information to determine if any of the objects have changed since the baseline snapshot was generated. In some embodiments of the present invention, the information provider module 156 is configured to interface between the baseline provider module 158 and the data collectors so that the baseline provider module 158 may operate using terms defined by the uniform information model 1000 (FIG. 12) and the information provider module 156 may convert such terms to terms used by the respective data collectors in obtaining the information.

The information provider module 156 and/or baseline provider module 158 stored in the memory 136 may be executed by the processor 138 and may use the databases 152, 154, which are also available to the processor 138.

While shown as resident in the memory 136 in the embodiments of FIG. 18, it will be understood that the respective database and provider (application module) features may be implemented, for example, as application programs, as components of a dynamic link library or the like of the data processing system 134 so as to be executed in whole or in part by the processor 138. Accordingly, the particular groupings illustrated in FIG. 18 are solely for the purposes of explanation of the present invention.

Computer implemented methods for monitoring changes in objects on a computer system according to various embodiments of the present invention will now be described with reference to the flow chart illustrations of FIGS. 19-22. Referring first to the embodiments illustrated in the flow chart of FIG. 19, operations begin with generating a baseline definition query that identifies object types to be included in a baseline snapshot and their associated attributes (block 1900). A request to generate a baseline snapshot of a plurality of objects having associated object types is received (block 1910). At least one of the objects has an object type not managed by a file system of the computer system in some embodiments of the present invention. The received request at block 1910 may include an identification of the baseline definition query generated at block 1900 as such baseline definition query will be used to generate the baseline snapshot as will now be described.

Responsive to the request to generate a baseline snapshot, current information is obtained from a plurality of data collectors to determine one or more attributes of each of the objects to define the baseline snapshot (block 1920). A request for a baseline report for the objects is received (block 1930). Responsive to the request for a baseline report, updated information is obtained from the plurality of data collectors to update the one or more attributes of each of the objects (block 1940). The baseline snapshot is compared to the obtained updated information to determine if any of the objects have changed (block 1950).

It will be understood that, in some embodiments of the present invention, the objects for which changes are monitored will be specified by the baseline definition query generated at block 1900 and further that multiple baseline definition queries may be defined. In addition, as will be described further herein, for some embodiments, parameters included in the baseline definition query may be dynamic and a plurality of baseline snapshots may be generated for a particular baseline definition query, where each snapshot has a corresponding associated set of parameters in addition to being associated with the respective baseline definition query. As described with reference to FIG. 18, the operations described operations with respect to FIG. 19 may be carried out by a baseline provider module (BP) alone or in combination with an information provider module (IP). Furthermore, the BP may include a baseline definition loader (BDL) providing a user interface for the BP that generates the baseline definition query and saves the generated baseline definition query as a baseline definition text file.

Figure 20:
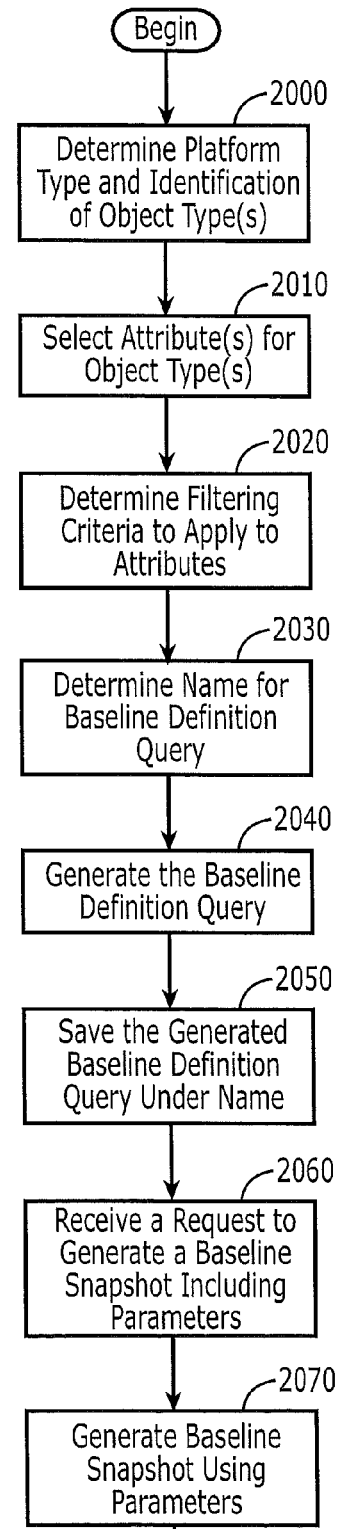

Further embodiments of the present invention will now be described with reference to the flow chart illustration of FIG. 20. In particular, the operations described with reference to block 2000 through 2030 correspond to embodiments of generating a baseline definition query as discussed with reference to block 1900 of FIG. 19. As shown for the embodiments of FIG. 20, operations begin by determining a platform type and an identification of an object type associated with the platform type for an object type to be included in the baseline definition query (block 2000). For example, as seen in FIG. 1, a UNIX platform and a file object type are selected. At least one attribute to be included in the baseline definition query for the identified object type is selected (block 2010). For example, as seen in FIG. 2, the selected attributes include File Name, Path, Device Number, I-Node Number, Mode and Type.

A filtering criteria or criterion to apply to the identified object type by the baseline definition query is determined (block 2020). The filtering criteria are applied to at least one attribute of the identified object type included in the baseline definition query. For example, FIG. 3 illustrates selection of a "WHERE . . . MATCHES" conditional based on the attribute File Name where a user selectable criterion, rather than a fixed value, is selected as indicated in the Criteria column notation "%{FILE NAME}." A name to be associated with the generated baseline definition is determined (block 2030). For example, as seen in FIG. 6, the selected name is "File baseline check."

The baseline definition query is generated based on the identified object type, the selected attribute or attributes for the object type and the determined filtering criteria or criterion (block 2040). More than one object type may be included in a baseline definition query. The generated baseline definition query is saved under the determined name (block 2050).

In some embodiments of the present invention, the generated baseline definition query is saved as an XML file including static code and a dynamic section including a medatag. An example of such a file is illustrated, for example, in TABLE 1. The indicated dynamic generated code in TABLE 1 corresponds to a dynamic section to include a medatag to be replaced at the time of generating a baseline snapshot as will be further described.

A request is received to generate a baseline snapshot (block 2060). For the embodiments of FIG. 20, the received request includes an identification of parameters for use in applying the filtering criteria. Such parameters are used to substitute for the medatag in the dynamic section as described previously. FIG. 4 illustrates an example of a definition of such parameters in establishing the baseline definition query, where the parameters may be subsequently replaced with user specified values, rather than wild card values. More particularly, the parameters are used to generate dynamic code to replace a medatag or medatags in some embodiments so as to generate a baseline snapshot. Similar operations may occur in generating a baseline definition. However, generally for purposes of consistent comparison, a baseline definition and a baseline snapshot to which it is compared, will each be generated with a common set of parameters. Accordingly, a plurality of baseline snapshots may be developed based on a single baseline definition query in some embodiments of the present invention. The received request to generate baseline snapshot may include an identification, by the name determined at block 2030, for the baseline and definition query to be used in generating the baseline snapshot. The baseline snapshot is then generated using the received parameters and identified baseline definition query (block 2070).

Figure 21:
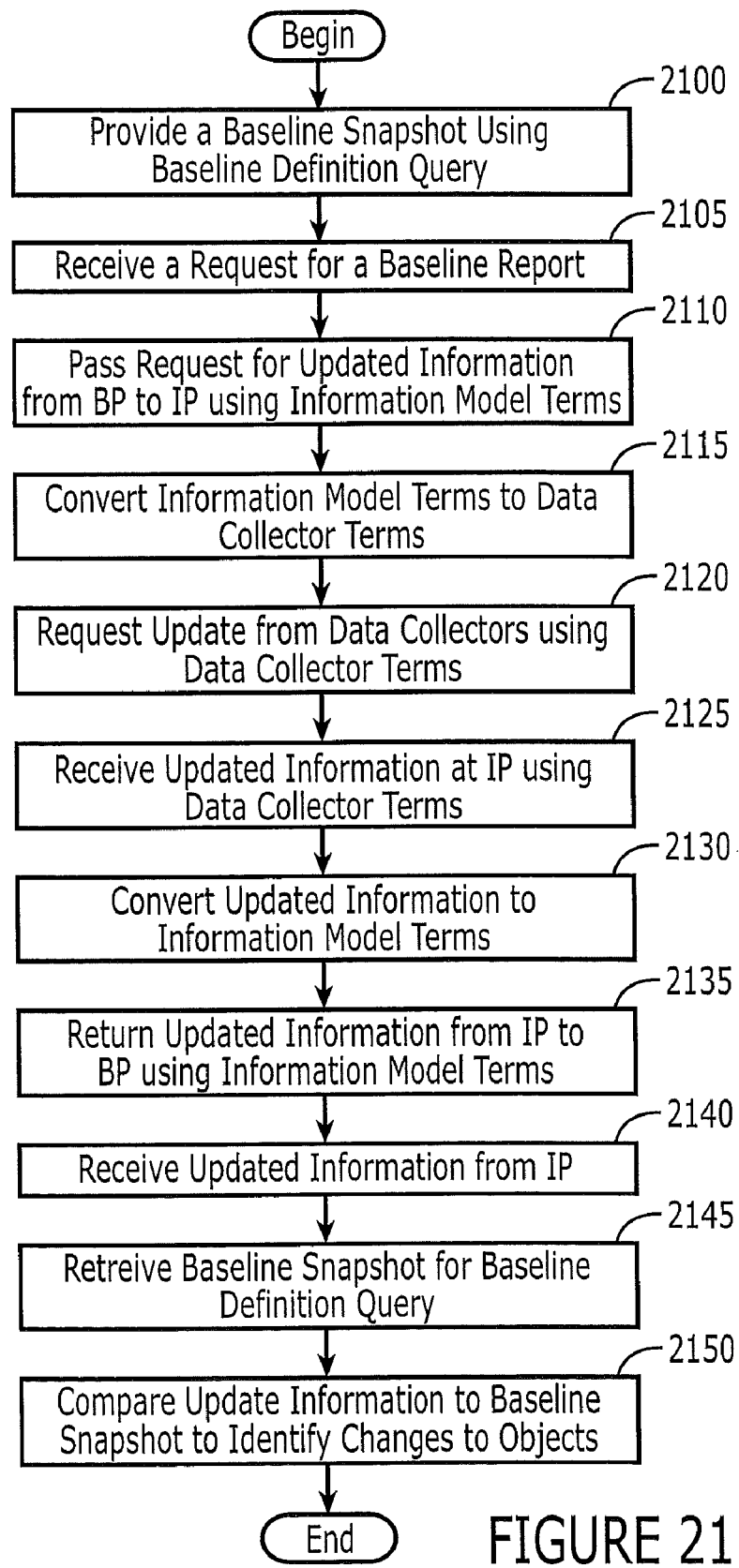

Further embodiments of the present invention will now be described with reference to the flow chart illustration of FIG. 21. In particular, the embodiments illustrated in FIG. 21 include the use of a uniform information model, an information provider module 156 and a baseline provider module 158 as shown in FIG. 18 and further shown in FIGS. 8-17. For the embodiments of FIG. 21, operations begin with providing a baseline snapshot of a plurality of objects having associated object types and attributes (block 2100). The baseline snapshot is generated based on a baseline definition query, for example, as described with reference to FIG. 20 previously and also illustrated in FIGS. 8-11. As described with reference to those figures, the baseline snapshot may be provided by a baseline provider module (BP) receiving current information from the information provider module (IP) and using the received current information to generate the baseline snapshot. The baseline snapshot may then be saved in the baseline snapshot database 154.

A request for a baseline report for a plurality of objects is received at the baseline provider (block 2105). A request for updated information regarding the attributes of the plurality of objects is passed from the BP to an IP using terms defined by the uniform information model (block 2110).

The terms defined by the uniform information model are converted to terms used by a plurality of data collectors to determine the attributes (block 2115). The respective data collectors determine the attributes for corresponding ones of the object types. The updated information is requested from the data collectors using the terms used by the respective data collectors (block 2120). The updated information from the data collectors is received at the IP using the terms used by the respective data collectors (block 2125).

The terms used by the respective data collectors are converted to the terms defined by the uniform information model (block 2130). The updated information is returned from the IP to the BP using the terms defined by the uniform information model (block 2135).

Note that, in some embodiments of the present invention, a received request to generate a baseline snapshot may include an identification of an object type not previously processed by the BP. A request for an identification of attributes associated with a not previously processed object type may be passed from the BP to the IP and the identification of attributes may be returned to the BP from the IP using the terms defined by the uniform information model. As such, the IP may handle the issues related to any additions of an object type while using an unmodified BP. Furthermore, a request may be received to add a new object type to be monitored on the computer system to an existing or a new baseline definition query, where the new object type has also not previously been processed by the IP. In some embodiments, the IP is updated to support the new object type using the uniform information model by defining terms to be associated with the new object type and attributes thereof under the uniform information model and defining a data collector for the new object type and the terms used by the data collector for obtaining information about the attribute of the new object type. Thus, additional object types may be implemented without requiring any modifications to the BP in some embodiments of the present invention.

The operations at blocks 2105-2135 have been described with reference to generation of a baseline report based on updated information from data collectors. It will be understood, however, that substantially similar operations are utilized in some embodiments in obtaining the corresponding current information used to provide a baseline snapshot. In other words, in some embodiments, the operations at block 2100 for providing a baseline snapshot may proceed substantially as described for obtaining a baseline report at blocks 2105 through 2135.

Operations for comparing the baseline snapshot to the obtained updated information to determine if any of the objects have changed will now be described with reference to blocks 2140-2150. The updated information is received from the IP at the BP (block 2140). The BP retrieves a baseline snapshot from the baseline snapshots database 154 corresponding to the retrieved baseline definition query (and parameters) used to generate the request for establishing the baseline snapshot and the updated information for the baseline report (block 2145). The retrieved baseline snapshot is compared to the received updated information by the BP to determine if any of the objects have changed (block 2150). Note that, in some embodiments, the returned current information for use in providing a baseline snapshot at block 2100 or updated information for use in establishing a baseline report includes returning object instances and their associated attributes that meet the filtering criterion (or criteria) defined by the baseline definition query.

Figure 22:
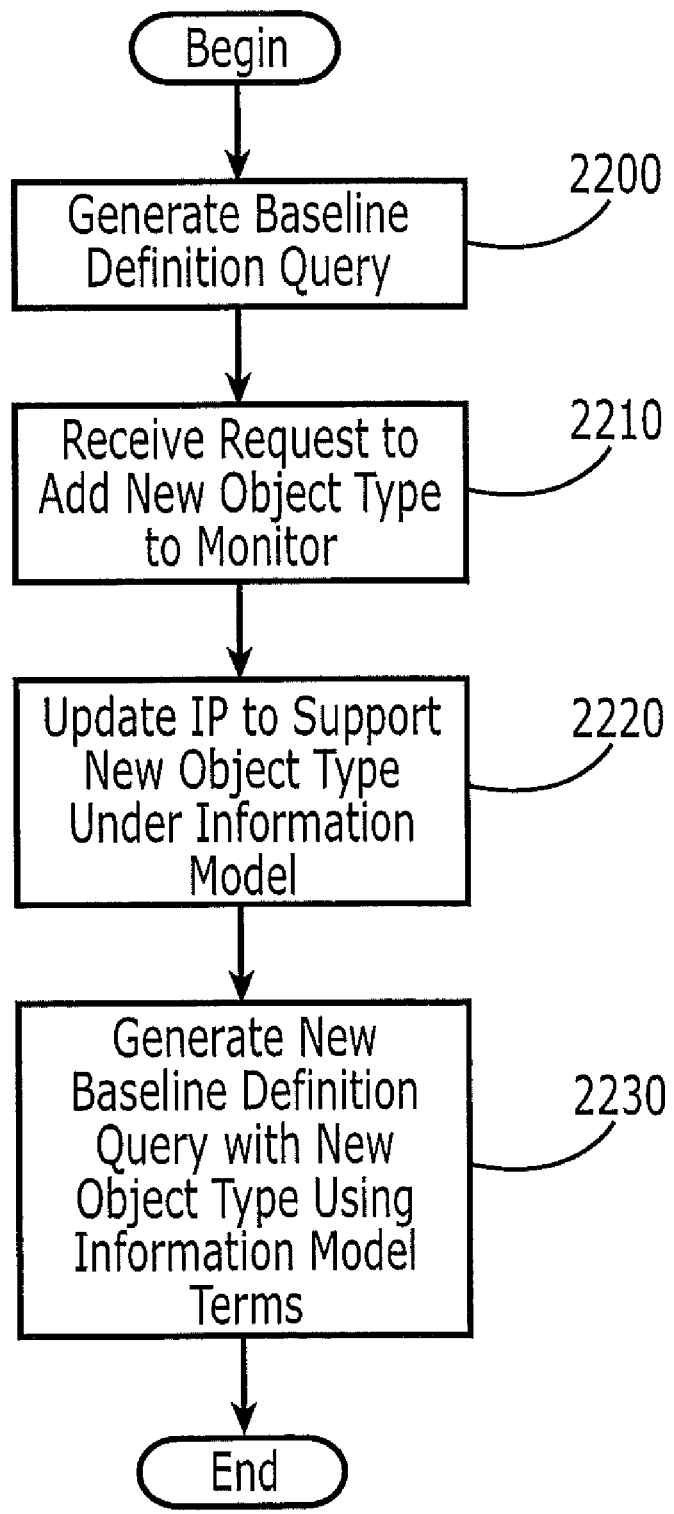

Further embodiments of the present invention will now be described with reference to the flow chart illustration of FIG. 22. More particularly, the operations to be described with reference to FIG. 22 relate to embodiments for generating an updated baseline definition query. In the embodiments of FIG. 22, operations begin with generating the baseline definition query (block 2200). A request to add a new object type to be monitored on the computer system is received (block 2210). The IP is updated to support the new object type using the uniform information model (block 2220). Operations at block 2220 include defining terms to be associated with the new object type and attributes thereof under the uniform information model and further include defining a data collector for the new object type and terms used by the data collector for the new object type. A new baseline definition query is generated including the new object type and attributes thereof using the corresponding terms defined under the uniform information model (block 2230).

In the flow chart and block diagram illustrations of FIG. 8-22, each block may represent a module, segment, or portion of code, which comprises one or more executable instructions for implementing the specified logical function(s). It should also be noted that in other implementations, the function(s) noted in the blocks and/or process flows may occur out of the order noted in the figures.

Various advantages may be provided by some embodiments of the present invention. For example, there may be no or reduced need to re-compile code to add new objects. This approach may also provide easy extensibility beyond default components that are monitored. An explicit ability may be provided to monitor without compiled code changes. While described above primarily with reference to method embodiments, it will be understood that systems and computer program products are also provided.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method for monitoring changes in objects on a computer system, the method comprising:
    providing a uniform information model for the objects on the computer system;
    receiving a request to generate a baseline snapshot of a plurality of objects having associated object types, including at least one object having an object type not managed by a file system of the computer system, the request including an identification of a baseline definition query that identifies object types to be included in the generated baseline snapshot and their associated attributes, wherein the identification of object types and their associated attributes are specified using terms defined by the uniform information model;
    converting the terms defined by the uniform information model to terms used by respective ones of a plurality of data collectors associated with the identified object types and their associated attributes;
    requesting information from the data collectors using the terms used by the respective data collectors;
    receiving the information from the data collectors using the terms used by the respective data collectors;
    converting the terms used by the respective data collectors to the terms defined by the uniform information model; and
    returning the information to a requestor of the baseline snapshot using the terms defined by the uniform information model.

2. The method of claim 1, wherein the requestor of the baseline snapshot is a a baseline provider module (BP) and the request to provide a baseline snapshot is received at an information provider module (IP) and wherein the IP is communicatively coupled to the uniform information model and to the data collectors.

3. The method of claim 2, wherein respective ones of the objects have object types associated with a corresponding one of a plurality of platform types.

4. The method of claim 3, wherein the plurality of platform types includes Unix™ servers and Windows™ servers.

5. A method for monitoring changes in objects on a computer system, the method comprising:
    providing a baseline snapshot of a plurality of objects having associated object types and attributes, the baseline snapshot being generated based on a baseline definition query, wherein the object types and the attributes are specified using terms defined by a uniform information model;
    receiving a request for a baseline report for the plurality of objects at a baseline provider module (BP);
    passing a request for updated information regarding the attributes of the plurality of objects from the BP to an information provider module (IP) using the terms defined by the uniform information model;
    converting the terms defined by the uniform information model to terms used by a plurality of data collectors to determine the attributes, wherein the respective data collectors determine attributes for corresponding ones of the object types;
    requesting the updated information from the data collectors using the terms used by the respective data collectors;
    receiving the updated information from the data collectors at the IP using the terms used by the respective data collectors;
    converting the terms used by the respective data collectors to the terms defined by the uniform information model;
    returning the updated information from the IP to the BP using the terms defined by the uniform information model; and
    comparing the baseline snapshot to the obtained updated information to determine if any of the objects have changed.

6. The method of claim 5, wherein providing the baseline snapshot is preceded by:
    generating the baseline definition query;
    receiving a request to add a new object type to be monitored on the computer system;
    updating the IP to support the new object type using the uniform information model by defining terms to be associated with the new object type and attributes thereof under the uniform information model and defining a data collector for the new object type and terms used by the data collector for the new object type; and
    generating a new baseline definition query including the new object type and attributes thereof using the corresponding terms defined under the uniform information model.

7. A system configured to carry out the method of claim 5.

8. A computer program product for monitoring changes in objects on a computer system, the computer program product comprising computer program code embodied in a computer readable medium, the computer program code comprising program code configured to carry out the method of claim 5.

9. A system for monitoring changes in objects on a computer system, comprising:
    a uniform information model, stored on the computer system, for the objects on the computer system, including at least one object having an object type not managed by a file system of the computer system; and
    an information provider module (IP) configured to obtain information from a plurality of data collectors to determine associated attributes of the objects to generate a baseline snapshot of identified ones of the objects on the computer system using terms used by respective ones of a plurality of data collectors associated with the identified objects and their associated attributes, to convert the terms used by respective ones of a plurality of data collectors associated with the identified object types and their associated attributes to terms defined by the uniform information model and to return the information to a requestor of the baseline snapshot using the terms defined by the uniform information model.

10. A computer program product for monitoring changes in objects on a computer system, the computer program product comprising:
a computer-readable storage medium having computer-readable program code embodied in said medium, said computer-readable program code comprising:
computer-readable program code that receives a request to generate a baseline snapshot of a plurality of objects having associated object types, including at least one object having an object type not managed by a file system of the computer system, the request including an identification of a baseline definition query that identifies object types to be included in the generated baseline snapshot and their associated attributes, wherein the identification of object types and their associated attributes are specified using terms defined by the uniform information model;
computer-readable program code that converts the terms defined by the uniform information model to terms used by respective ones of a plurality of data collectors associated with the identified object types and their associated attributes;
computer-readable program code that requests information from the data collectors using the terms used by the respective data collectors;
computer-readable program code that receives the information from the data collectors using the terms used by the respective data collectors;
computer-readable program code that converts the terms used by the respective data collectors to the terms defined by the uniform information model; and
computer-readable program code that returns the information to a requestor of the baseline snapshot using the terms defined by the uniform information model.

11. A method for monitoring changes in objects on a computer system, the method comprising:
receiving a request to generate a baseline snapshot of a plurality of objects having associated object types, including at least one object having an object type not managed by a file system of the computer system;
obtaining current information, responsive to the request to generate a baseline snapshot, from a plurality of data collectors to determine at least one attribute of each of the objects to define the baseline snapshot;
receiving a request for a baseline report for the objects;
obtaining updated information, responsive to the request for a baseline report, from the plurality of data collectors to update the at least one attribute of each of the objects; and
comparing the baseline snapshot to the obtained updated information to determine if any of the objects have changed.

12. The method of claim 11, wherein receiving the request to generate the baseline snapshot is preceded by generating a baseline definition query that identifies object types to be included in the generated baseline snapshot and their associated attributes and wherein receiving the request to generate the baseline report includes receiving an identification of the baseline definition query.

* * * * *